United States Patent
Terao et al.

(10) Patent No.: US 8,362,744 B2
(45) Date of Patent: Jan. 29, 2013

(54) BATTERY CHARGING PAD EMPLOYING MAGNETIC INDUCTION

(75) Inventors: Kyozo Terao, Sumoto (JP); Shoichi Toya, Minamiawaji (JP)

(73) Assignee: Sanyo Electric Co., Ltd., Osaka (JP)

( * ) Notice: Subject to any disclaimer, the term of this patent is extended or adjusted under 35 U.S.C. 154(b) by 332 days.

(21) Appl. No.: 12/814,704

(22) Filed: Jun. 14, 2010

(65) Prior Publication Data

US 2010/0315038 A1    Dec. 16, 2010

(30) Foreign Application Priority Data

Jun. 16, 2009    (JP) ................................ 2009-143677

(51) Int. Cl.
 *H02J 7/00*    (2006.01)
 *H01F 27/42*   (2006.01)
(52) U.S. Cl. ...................................... 320/108; 307/104
(58) Field of Classification Search ................. 320/108; 307/104
See application file for complete search history.

(56) References Cited

U.S. PATENT DOCUMENTS

| 5,821,731 | A  | * | 10/1998 | Kuki et al. ..................... 320/108 |
| 7,915,858 | B2 | * | 3/2011  | Liu et al. ....................... 320/108 |
| 2004/0189246 | A1 | * | 9/2004 | Bulai et al. .................... 320/108 |
| 2009/0096413 | A1 | * | 4/2009 | Partovi et al. ................. 320/108 |
| 2009/0153098 | A1 |   | 6/2009 | Toya et al. |

FOREIGN PATENT DOCUMENTS

| JP | 3011829  | 6/1995 |
| JP | 9-63655  | 3/1997 |

OTHER PUBLICATIONS

Shoichi Toya et al., U.S. Appl. No. 12/765,235, filed Apr. 22, 2010, "*Device Housing a Battery and Charging Pad*".

* cited by examiner

*Primary Examiner* — M'Baye Diao
(74) *Attorney, Agent, or Firm* — Wenderoth Lind & Ponack, L.L.P.

(57) ABSTRACT

A battery charging pad includes a moving mechanism that moves the transmitting coil, and a position detection controller that detects the position of a device housing a battery and controls the moving mechanism to move the transmitting coil in close proximity to a receiving coil. Pulse signals are supplied to a plurality of position detection coils from a pulse generator, and the echo signals are a result of coil excitation by the pulse signals. The battery charging pad position detection controller detects the position of the receiving coil and moves the transmitting coil in close proximity to the receiving coil, and the position detection controller detects the position of the transmitting coil and moves the transmitting coil to the reference position, or it moves the transmitting coil in close proximity to the receiving coil.

20 Claims, 12 Drawing Sheets

BATTERY CHARGING PAD EMPLOYING MAGNETIC INDUCTION

BACKGROUND OF THE INVENTION

1. Field of the Invention

The present invention relates to a battery charging pad that transmits power by magnetic induction to charge rechargeable batteries contained in a device housing a battery that is placed on the charging pad.

2. Description of the Related Art

A battery charging pad (charging stand, charging cradle) has been developed to charge a battery housed in a device by transmitting power from a transmitting coil (power supply coil, primary coil) to a receiving coil (induction coil, secondary coil) by magnetic induction. (Refer to Japanese Laid-Open Patent Publication H09-63655 (1997) and Utility Model Registration No. 3011829.)

JP H09-63655 A cites a configuration with a charging pad housing a transmitting coil driven by an alternating current (AC) power source, and a device housing a battery containing a receiving coil that magnetically couples with the transmitting coil. By positioning the transmitting coil in close proximity to the receiving coil, this charging pad can charge the battery housed in a device without direct physical contact.

SUMMARY OF THE INVENTION

In a system that puts the transmitting coil in close proximity to the receiving coil and transmits power from the transmitting coil to the receiving coil as cited in JP H09-63655 A, it is important to accurately position the transmitting coil close to the receiving coil. This is because if there is offset in the position of the transmitting coil relative to the receiving coil, the coils cannot magnetically couple in an ideal manner, and power transmission efficiency is reduced. This drawback can be resolved by providing an alignment projection on the charging pad, and an alignment cavity in the device housing a battery to accept the alignment projection as described in JP 3011829 U. With this structure, the alignment projection is inserted in the alignment cavity to prevent positional offset between the portable electronic device (housing a battery) and the charging pad.

However, the structure cited in JP 3011829 U requires setting the device housing a battery on the charging pad with the alignment projection inserted in the alignment cavity. Consequently, this system has the drawback that the device housing a battery cannot be set in an arbitrary position on the charging pad, and setting the device on the charging pad is troublesome. It also has the drawback that it is difficult to insure that all the users will always properly set the device housing a battery on the charging pad. Further, since this structure establishes an alignment cavity in the bottom of the device housing a battery and disposes a receiving coil above that alignment cavity, it has the additional drawback that the device housing a battery cannot be made with a thin outline. Since the device housing a battery such as a mobile phone is required to be as thin as possible, a device that is enlarged by an alignment cavity loses its convenience as a portable device.

To resolve these drawbacks, the present applicant developed a system to detect the position of the receiving coil in a device housing a battery placed on the charging pad, and move the transmitting coil to that detected position. This charging pad is provided with a position detection controller to detect the position of the receiving coil in the device housing a battery. This position detection controller has a plurality of position detection coils disposed in the top plate of the charging pad. This position detection controller emits a pulse signal from a position detection coil, and receives a magnetic transient signal re-emitted from the receiving coil as a result of pulse signal excitation of a receiving coil parallel resonant circuit. The magnetic transient signal re-emitted from the receiving coil parallel resonant circuit is referred to as an echo signal in this application, and the echo signal is used to detect the position of the receiving coil. The amplitude of the echo signal varies with the position of the receiving coil relative to the position detection coil, and the further the receiving coil is from the position detection coil, the lower the amplitude of the echo signal. Therefore, the distance that the receiving coil is separated from each pulse signal emitting position detection coil can be determined from the amplitude of the echo signal. By detecting the receiving coil position and moving the transmitting coil to that detected position, this position detection controller can put the transmitting coil in close proximity to the receiving coil.

This position detection controller detects receiving coil position in the X-axis direction and Y-axis direction with respect to a reference point such as the origin of the orthogonal XY-coordinate system. The position detection controller moves the transmitting coil to the detected position in the X-direction and Y-direction to put the transmitting coil in close proximity to the receiving coil. Since this charging pad moves the transmitting coil to the detected position in the X-direction and Y-direction to put it in close proximity with the receiving coil, it is necessary to initially move the transmitting coil to the reference point. Consequently, when the power switch is turned ON, the transmitting coil must be moved to the reference point. A transmitting coil that has been moved to the reference point can subsequently be moved to the detected receiving coil position, which is X-direction position and Y-direction position of the receiving coil, to put the transmitting coil in close proximity to the receiving coil. To implement this operation, the charging pad must move the transmitting coil to the reference point. To reliably move the transmitting coil to the reference point, it is necessary to provide position detection sensors such as limit switches to detect movement of the transmitting coil to the reference point. In a system provided with position detection sensors, lead wires are connected to the position detection sensors and those lead wires must connect with the position detection controller. Consequently, lead wire and circuit structure to detect the position of the transmitting coil becomes complex, and this system has the drawback that manufacturing cost becomes high.

The present invention was developed with the object of further correcting these drawbacks. Thus, it is an important object of the present invention to provide a battery charging pad with a novel circuit structure that uses the receiving coil position detection controller to detect transmitting coil position, greatly simplifying transmitting coil position detection to reduce manufacturing cost while allowing the battery contained in a device housing a battery to be charged via magnetic induction.

The battery charging pad of the present invention transmits power from a transmitting coil 11 to a magnetically coupled receiving coil 51 to charge an internal battery 52 contained in a device housing a battery 50. The battery charging pad is provided with a transmitting coil 11 that is put in close proximity to a receiving coil 51 in the device housing a battery 50 to transmit power to that receiving coil 51, a case 20 housing the transmitting coil 11 and having a top plate 21 where a device housing a battery 50, 90 is placed, a moving mechanism 13 housed in the case 20 that moves the transmitting coil 11 close to the receiving coil 51, and a position detection controller 14, 64 that detects the position of a device housing a battery 50, 90 placed on the top plate 21 and controls the moving mechanism 13 to move the transmitting coil 11 in close proximity to the receiving coil 51 in the device housing a battery 50, 90. The position detection controller 14, 64 is provided with a plurality of position detection coils 30 fixed to the inside surface of the top plate 21, a pulse generator 31 that supplies pulse signals to the position detection coils 30, a receiving circuit 32 that receives echo signals output from the receiving coil 51 and transmitting coil 11 to the position detection coils 30 as a result of excitation by pulse signals supplied to the position detection coils 30 from the pulse generator 31, and a discrimination circuit 33 that determines the position of the receiving coil 51 and the transmitting coil 11 from the echo signals received by the receiving circuit 32. The battery charging pad position detection controller 14, 64 detects the position of the receiving coil 51 and controls the moving mechanism 13 to move the transmitting coil 11 in close proximity to the receiving coil 51. The position detection controller 14, 64 also detects the position of the transmitting coil 11 and moves the transmitting coil 11 to the reference point, or it detects the position of the transmitting coil 11 relative to the receiving coil 51 and moves the transmitting coil 11 in close proximity to the receiving coil 51.

In the battery charging pad described above, the position detection controller that detects the position of the receiving coil in the device housing a battery serves the dual purpose of detecting the position of the transmitting coil. Therefore, components such as limit switches provided in prior art battery charging pads to detect transmitting coil position are unnecessary. Consequently, this battery charging pad has the characteristic that transmitting coil position can be detected and the transmitting coil can be put in close proximity to the receiving coil while reducing manufacturing cost.

In the battery charging pad of the present invention, the position detection controller 14, 64 can detect the position of the transmitting coil 11, and move it to the origin of the X-axis and Y-axis coordinate system. Since this battery charging pad detects the position of the transmitting coil and moves it to the origin, the transmitting coil can be moved to the position of the receiving coil using the origin as the reference point.

In the battery charging pad of the present invention, the position detection coils 30 can be made up of a plurality of position detection coils 30, and those position detection coils 30 can be fixed at given intervals to the inside surface of the top plate 21. Further, the position detection coils 30 can be provided with a plurality of X-axis detection coils 30A that detect receiving coil 51 position in the X-axis direction, and a plurality of Y-axis detection coils 30B that detect position in the Y-axis direction. This battery charging pad transmits pulse signals from the pulse generator to the position detection coils, and accurately detects the positions of the receiving coil and transmitting coil electronically from the echo signals output from receiving coil and transmitting coil.

In the battery charging pad of the present invention, the plurality of X-axis detection coils 30A can be shaped as long narrow loops extending in the Y-axis direction and fixed to the inside surface of the top plate 21 at given intervals. The plurality of Y-axis detection coils 30B can be shaped as long narrow loops extending in the X-axis direction and fixed to the inside surface of the top plate 21 at given intervals.

In the battery charging pad of the present invention, the interval (d) between adjacent X-axis detection coils 30A can be smaller than the outside diameter (D) of the receiving coil 51 and smaller than the outside diameter (W) of the transmitting coil 11. Further, the interval (d) between adjacent Y-axis detection coils 30B can be smaller than the outside diameter (D) of the receiving coil 51 and smaller than the outside diameter (W) of the transmitting coil 11. This battery charging pad can detect receiving coil and transmitting coil position with additional accuracy.

In the battery charging pad of the present invention, a switching circuit 41 can be provided between the transmitting coil 11 and AC power source 12, and this switching circuit 41 can connect the transmitting coil 11 to the AC power source 12 to supply AC power to the transmitting coil 11 from the AC power source 12. Further, the switching circuit 41 can put both sides of the output at ground potential to allow detection of the transmitting coil 11 position. This battery charging pad can use the switching circuit that supplies AC power to the transmitting coil to control conditions for transmitting coil position detection. Consequently, provision of special purpose circuitry to put the transmitting coil in a state for position detection is unnecessary, and the transmitting coil position can be detected with a simple circuit structure.

In the battery charging pad of the present invention, a capacitor 18 connected in parallel with the transmitting coil 11 can be provided to form a parallel resonant circuit 19A. The capacitance C1 of the capacitor 18 connected in parallel with the transmitting coil 11 can be larger than the capacitance C2 of the capacitor 53 connected in parallel with the receiving coil 51 to form a parallel resonant circuit 54 in the device housing a battery 50. This battery charging pad allows the position detection controller 14, 64 to distinguish between the position of the transmitting coil 11 and receiving coil 51. This is because the different capacitance values establish different time delays in the echo signals output from the transmitting coil 11 and receiving coil 51 to the position detection coils 30.

In the battery charging pad described above, the positions of the transmitting coil and receiving coil can be distinguished by time delay differences in the echo signals. This allows the position of the transmitting coil and the position of the receiving coil to be rapidly detected with a single position detection controller.

In the battery charging pad of the present invention, the position detection controller 14 can be provided with a first position detection controller 14A that detects the position of the transmitting coil 11 and the position of the receiving coil 51, and a second position detection controller 14B, 14C that detects the position of the receiving coil 51 with high precision. The first position detection controller 14A can be provided with position detection coils 30. This battery charging pad can more precisely detect the position of the receiving coil and accurately move the transmitting coil to the position of the receiving coil while also detecting the position of the transmitting coil with the first position detection controller.

In the battery charging pad of the present invention, the second position detection controller 14C can detect receiving coil 51 position by either the oscillating frequency of the AC power source 12, transmitting coil 11 voltage, AC power source 12 power consumption, or receiving coil 51 current. This battery charging pad can more precisely detect receiving coil position to refine optimum coil position and greatly improve power transmission efficiency.

The above and further objects of the present invention as well as the features thereof will become more apparent from the following detailed description to be made in conjunction with the accompanying drawings.

DETAILED DESCRIPTION OF THE INVENTION

The following describes embodiments of the present invention based on the figures. However, the following embodiments are merely specific examples of battery charging pads representative of the technology associated with the present invention, and the battery charging pad of the present invention is not limited to the embodiments described below.

Figure 1:
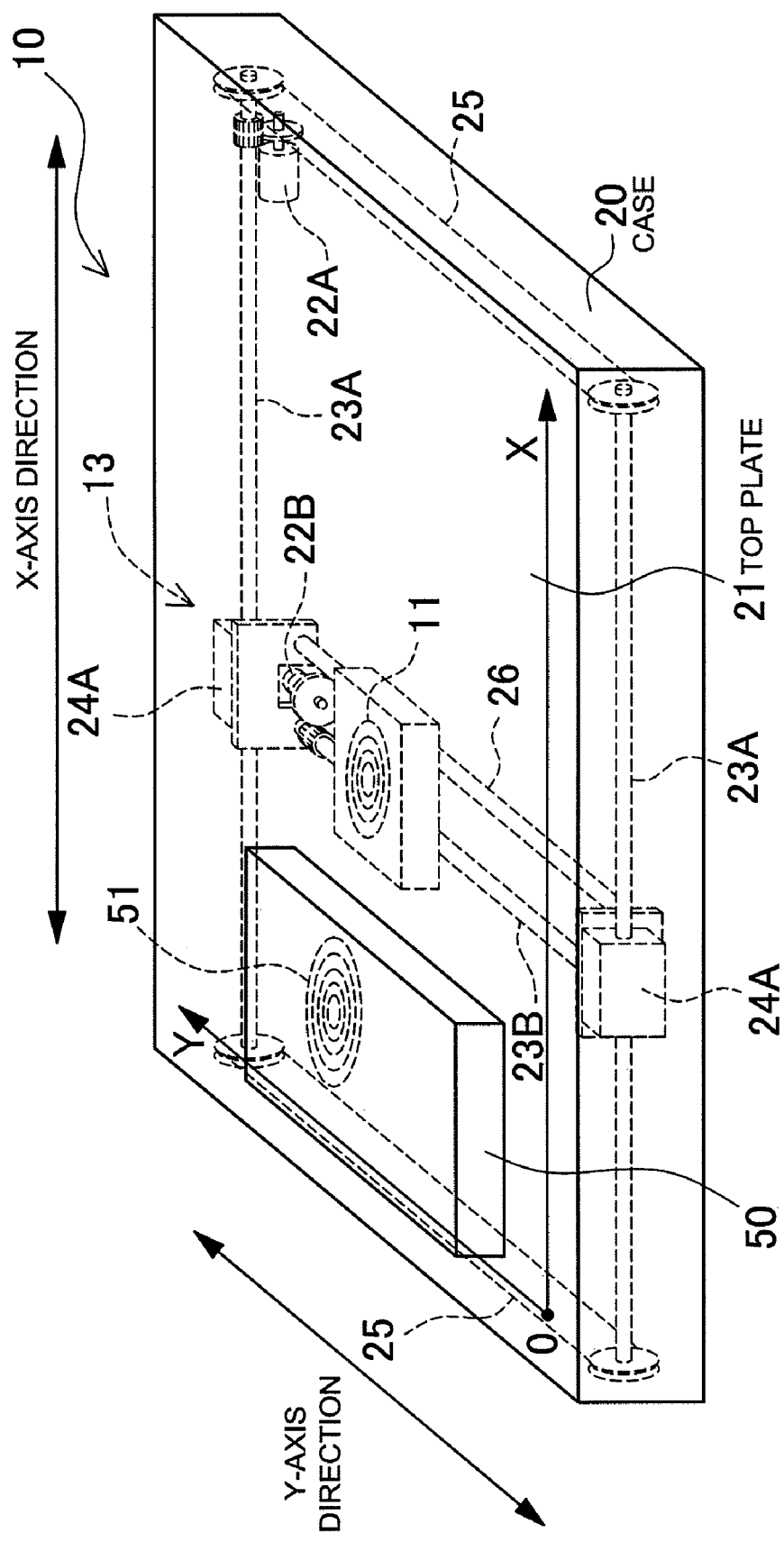
FIG. 1 is an abbreviated oblique view of a battery charging pad for an embodiment of the present invention.
Figure 2:
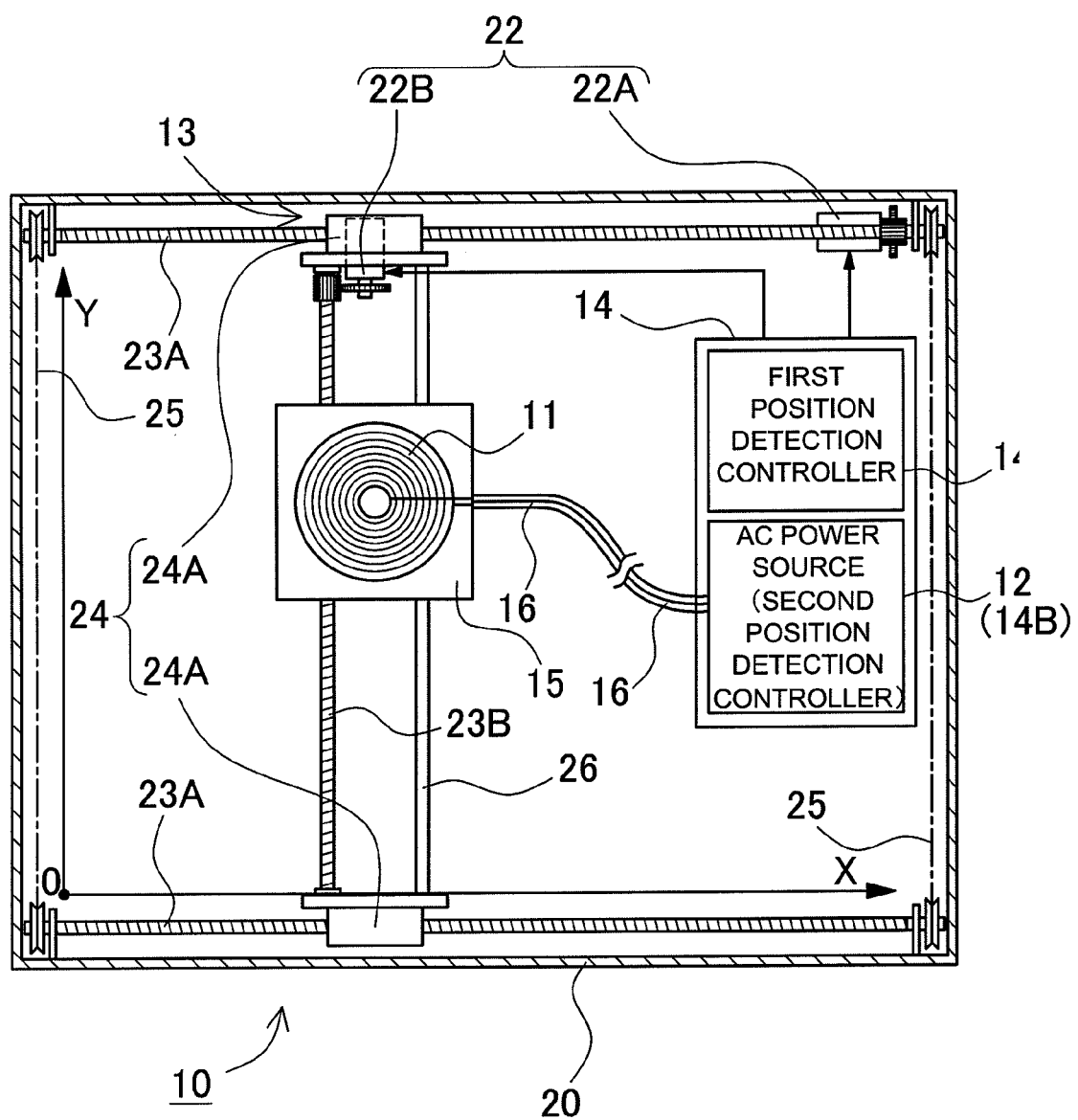
FIG. 2 is an abbreviated diagrammatic view of a battery charging pad for an embodiment of the present invention.
Figure 3:
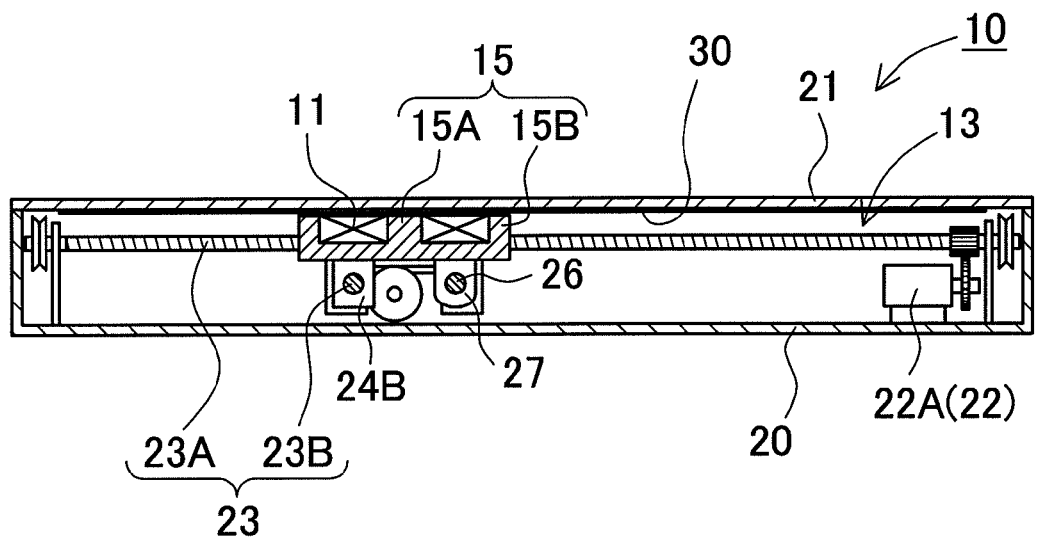
FIG. 3 is a lengthwise vertical cross-section view of the battery charging pad shown in FIG. 2.
Figure 4:
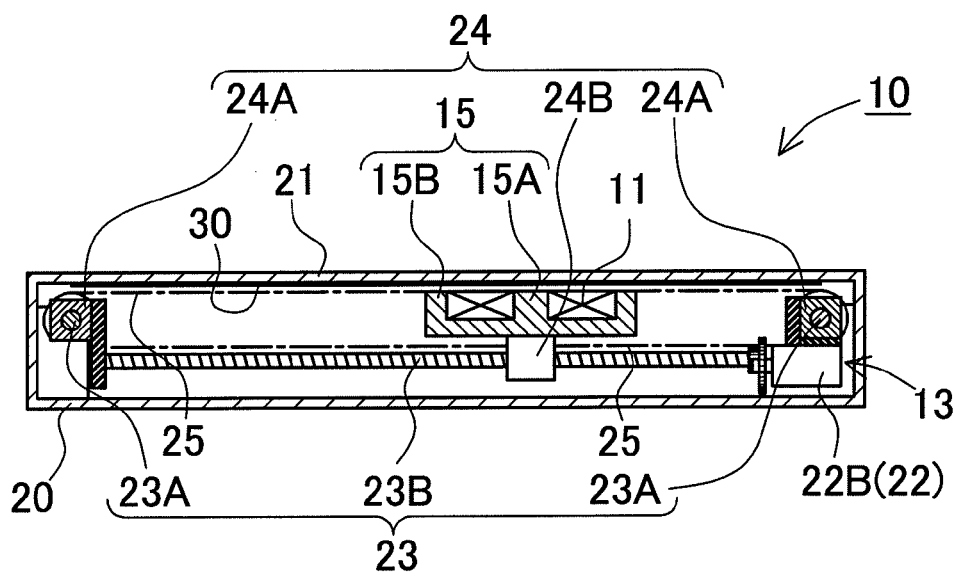
FIG. 4 is a widthwise vertical cross-section view of the battery charging pad shown in FIG. 2.
Figure 5:
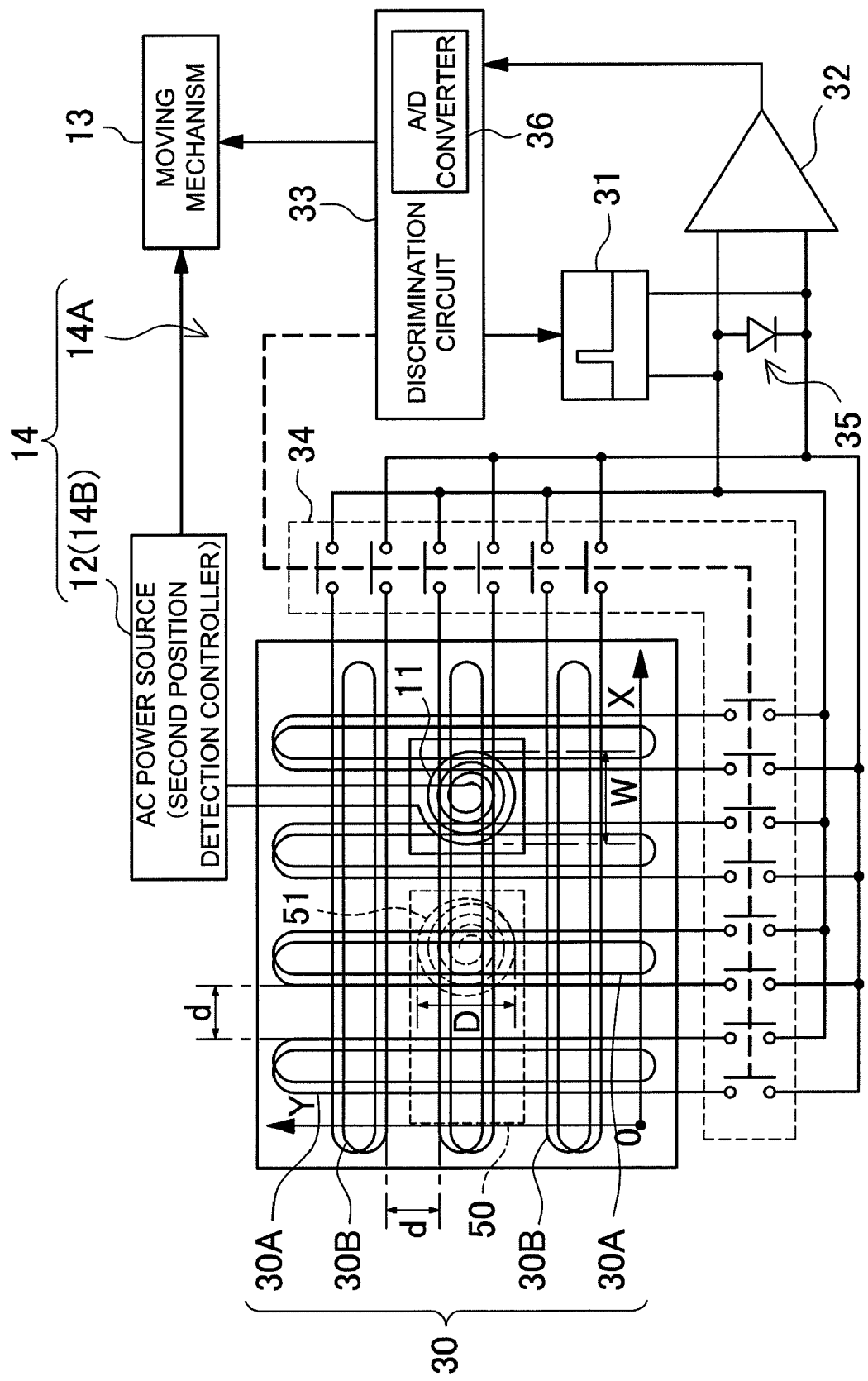
FIG. 5 is a circuit diagram showing the position detection controller of a battery charging pad for an embodiment of the present invention.
Figure 6:
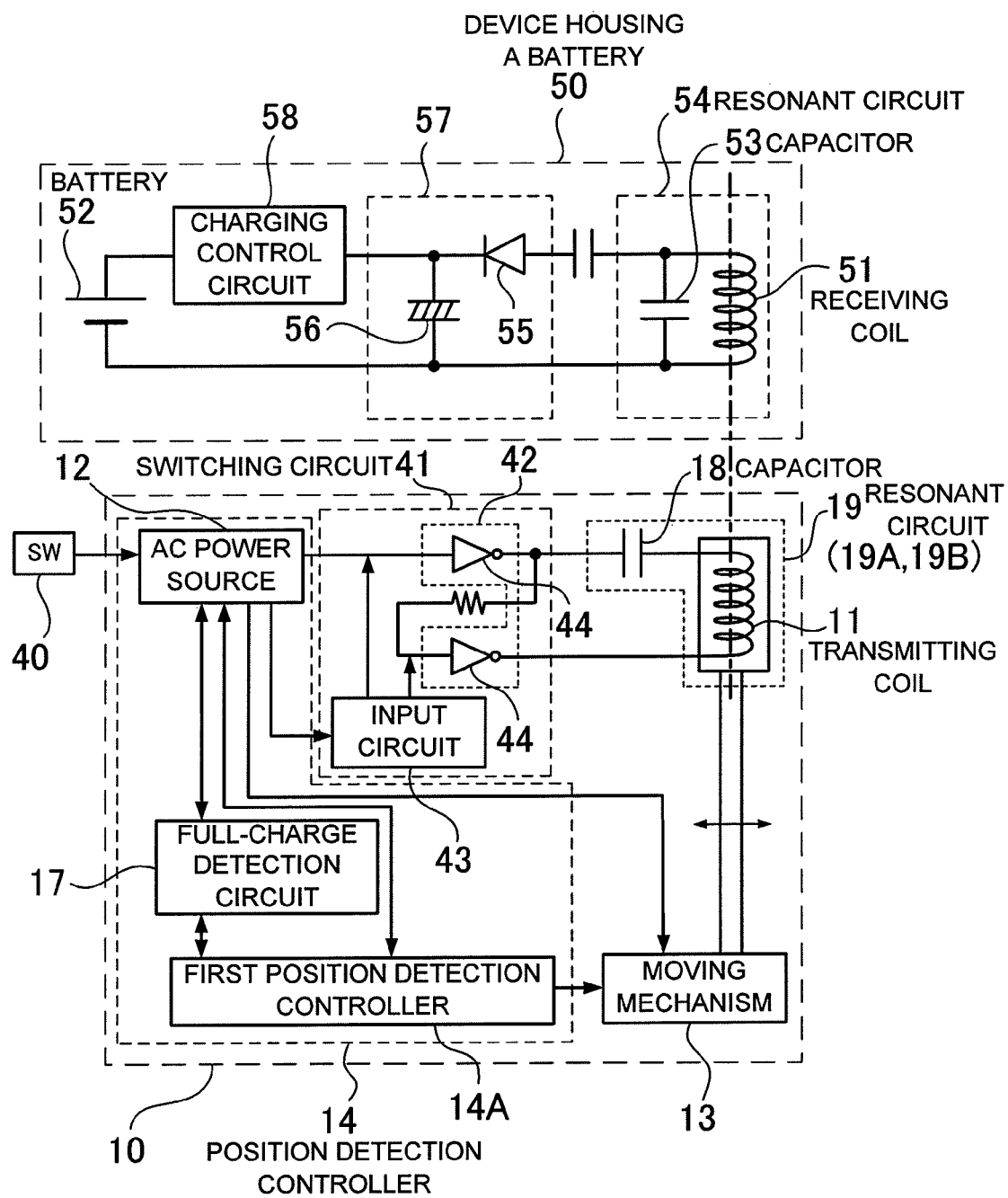
FIG. 6 is a block diagram of a battery charging pad and a device housing a battery for an embodiment of the present invention.

FIGS. 1-6 show abbreviated structural and conceptual views of a battery charging pad. As shown in FIGS. 1 and 6, a device housing a battery 50 is placed on the battery charging pad 10, and the internal battery 52 is charged utilizing magnetic induction. A device housing a battery 50 contains a receiving coil 51 that magnetically couples with the transmitting coil 11. The device housing a battery 50 also contains a battery 52 that is charged by power induced in the receiving coil 51. Here, the device housing a battery 50 can also be a battery pack.

FIG. 6 shows a circuit diagram of the device housing a battery 50. The device housing a battery 50 has a capacitor 53 connected in parallel with the receiving coil 51. The capacitor 53 and receiving coil 51 form a parallel resonant circuit 54. The resonant frequency of the receiving coil 51 and parallel capacitor 53 is approximately at the transmitting coil 11 power transmission frequency to enable efficient power transmission from the transmitting coil 11 to the receiving coil 51. The device housing a battery 50 of FIG. 6 is provided with a diode 55 that converts AC output from the receiving coil 51 to direct current (DC), a rectifying circuit 57 made up of a smoothing capacitor 56 that smoothes the DC ripple current, and a charging control circuit 58 that charges the battery 52 with DC output from the rectifying circuit 57. The charging control circuit 58 detects full-charge of the internal battery 52 and stops charging.

As shown in FIGS. 1-6, the battery charging pad 10 is provided with a transmitting coil 11 connected to the AC power source 12 to induce electromotive force (EMF) in the receiving coil 51, a case 20 housing the transmitting coil 11 and having a top plate 21 to place a device housing a battery 50, a moving mechanism 13 housed in the case 20 to move the transmitting coil 11 along the inside surface of the top plate 21, and a position detection controller 14 that detects the position of a device housing a battery 50 placed on the top plate 21 and controls the moving mechanism 13 to move the transmitting coil 11 close to the receiving coil 51 of the device housing a battery 50. The transmitting coil 11, AC power source 12, moving mechanism 13, and position detection controller 14 are housed inside the case 20 of the battery charging pad 10.

The battery charging pad 10 charges the battery 52 inside the device housing a battery 50 in the following manner.

(1) When the battery charging pad 10 power switch 40 is switched ON, the position detection controller 14 detects the position of the transmitting coil 11.
(2) To move the transmitting coil 11 to the origin reference point, the distances for movement in the X-axis direction and Y-axis direction are computed from the detected position.
(3) The position detection controller 14 controls the moving mechanism 13 to move the transmitting coil 11 by the computed distances in the X-axis direction and Y-axis direction to the origin reference point. Here, to correct for any detection error, the distances to move the transmitting coil 11 are made slightly larger than the computed values. This is because the transmitting coil 11 cannot move past the origin and moving mechanism 13 slippage at the origin insures accurate movement to the origin.
(4) The position detection controller 14 detects the position in the X-axis direction and Y-axis direction of a device housing a battery 50 placed on the top plate 21 of the case 20.
(5) The position detection controller 14 controls the moving mechanism 13 to move the transmitting coil 11, which is at the origin reference point, to the detected position in the X-axis direction and Y-axis direction to position it in close proximity to the receiving coil 51 of the device housing a battery 50.
(6) The transmitting coil 11, which has been moved in close proximity to the receiving coil 51, is magnetically coupled to the receiving coil 51 and transmits AC power to the receiving coil 51.
(7) The device housing a battery 50 converts the receiving coil 51 AC power to DC and charges the internal battery 52 with that DC power.

The battery charging pad 10, which charges the battery 52 in a device housing a battery 50 according to the procedure described above, houses the transmitting coil 11 connected to the AC power source 12 inside the case 20. The transmitting coil 11 is disposed beneath the top plate 21 of the case 20 in a manner that allows it to move along the inside of the top plate 21. The efficiency of power transmission from the transmitting coil 11 to the receiving coil 51 is improved by narrowing the gap between the transmitting coil 11 and the receiving coil 51. With the transmitting coil 11 moved into close proximity to the receiving coil 51, the gap between the transmitting coil 11 and the receiving coil 51 is preferably made less than or equal to 7 mm. Therefore, the transmitting coil 11 is disposed under the top plate 21 and positioned as close as possible to the top plate 21. Since the transmitting coil 11 is moved close to the receiving coil 51 of a device housing a battery 50 placed on the top plate 21, the transmitting coil 11 is disposed in a manner that allows it to move along the inside surface of the top plate 21.

The case 20 that houses the transmitting coil 11 is provided with a planar top plate 21 where a device housing a battery 50 can be placed. The battery charging pad 10 of the figures has an overall planar top plate 21 that is disposed horizontally. The top plate 21 is made large enough to allow placement of various devices housing a battery 50 having different sizes and shapes. For example, the top plate 21 can have a rectangular shape with a side having a length of 5 cm to 30 cm, or it can have a circular shape with a diameter of 5 cm to 30 cm. The battery charging pad of the present invention can have a large top plate that allows simultaneous placement of a plurality of devices housing a battery. Here, the plurality of devices housing a battery can be placed simultaneously on the top plate, and their internal batteries can be charged sequentially. Further, the top plate can also be provided with side-walls or other barriers around its perimeter, and devices housing a battery can be placed inside the side-walls to charge the internal batteries.

The transmitting coil 11 is wound in a spiral shape in a plane parallel to the top plate 21, and radiates AC magnetic flux above the top plate 21. This transmitting coil 11 emits AC magnetic flux perpendicular to, and beyond the top plate 21. The transmitting coil 11 is supplied with AC power from the AC power source 12 and radiates AC magnetic flux above the top plate 21. Wire can be wound around a magnetic material core 15 to make a transmitting coil 11 with high inductance. The core 15 is magnetic material with a high magnetic permeability such as ferrite and has the shape of an open end container. The core 15 has a solid circular cylinder 15A at the center of the spiral wound transmitting coil 11 and a circular cylindrical enclosure 15B around the outside that are joined by a bottom section (refer to FIGS. 3 and 4). A transmitting coil 11 with a core 15 can focus magnetic flux in a specific region to efficiently transmit power to the receiving coil 51. However, a magnetic material core is not always required in the transmitting coil, and a coil with no core can also be used. Since a coil with no core is light, the moving mechanism that moves the transmitting coil inside the top plate can be simplified. The transmitting coil 11 is made with essentially the same outside diameter as the receiving coil 51 to efficiently transmit power to the receiving coil 51.

The AC power source 12 supplies high frequency power, for example 20 kHz to several MHz, to the transmitting coil 11. As shown in FIG. 6, a switching circuit 41 is connected between the AC power source 12 and the transmitting coil 11. The switching circuit 41 controls the supply of power from the AC power source 12 to the transmitting coil 11. When the internal battery 52 in the device housing a battery 50 becomes fully charged, the switching circuit 41 is switched OFF, and the supply of power to the transmitting coil 11 is stopped to suspend charging of the internal battery 52. In addition, a capacitor 18 is connected between the switching circuit 41 and the transmitting coil 11, and a resonant circuit 19 is formed by the transmitting coil 11 and that capacitor 18. Normally, the resonant circuit 19 formed by the transmitting coil 11 and the capacitor 18 is a series resonant circuit 19B.

Figure 7:
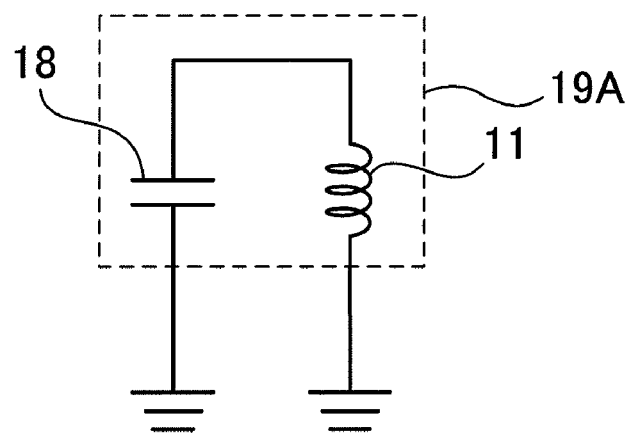
FIG. 7 is a circuit diagram of an equivalent circuit for the parallel resonant circuit formed by the transmitting coil and capacitor.

Specifically, when the switching circuit 41 connects the transmitting coil 11 to the AC power source 12, the transmitting coil 11 and capacitor 18 form a series resonant circuit 19B, and power is efficiently transmitted from the AC power source 12 to the transmitting coil 11. When the position of the transmitting coil 11 is being detected, the switching circuit 41 puts both sides of the output at ground potential to form a parallel resonant circuit 19A with the transmitting coil 11 and capacitor 18. As shown in FIG. 7, when the switching circuit 41 puts both sides of the output at ground, the resonant circuit 19 formed by the transmitting coil 11 and capacitor 18 has both sides connected to ground, and the transmitting coil 11 and capacitor 18 are effectively connected in parallel to form a parallel resonant circuit 19A. This parallel resonant circuit 19A is excited by pulse signals issued from the position detection coils 30, and generates echo signals in response. Both sides of the switching circuit 41 output are put at ground potential or connected to the AC power source 12 by control signals input from an input circuit 43.

The switching circuit 41 of FIG. 6 employs a full-bridge output circuit 42 connected to the output-side of the AC power source 12. This AC power source 12 has the full-bridge output circuit 42 connected to the output-side of an oscillator circuit to supply AC power to the transmitting coil 11. The oscillator circuit of the AC power source 12 is a crystal oscillator circuit with an oscillating frequency at the frequency of the AC power supplied to the transmitting coil 11. Oscillator circuit AC is power amplified by the full-bridge output circuit 42 and supplied to the transmitting coil 11. This AC power source 12 power amplifies the oscillator circuit AC signal via the full-bridge output circuit 42. Specifically, the oscillator circuit AC signal is input to the full-bridge output circuit 42 to enable AC power to be supplied to the transmitting coil 11. In addition, a voltage level such as a HIGH or LOW signal can be input from the input circuit 43 to put the output-side of the full-bridge output circuit 42 at ground potential, which is equivalent to connecting the output-side to a ground line. A full-bridge output circuit output signal that is in phase with the input can be set to ground potential by a LOW level input. A full-bridge output circuit 42 output signal that is the phase inverted input can be set to ground potential by a HIGH level input. This switching circuit 41 can control the signals input to the full-bridge output circuit 42 to connect both sides of the transmitting coil 11 together to increase the amplitude of the echo signals without providing special-purpose circuitry that includes components such as switching devices.

The full-bridge output circuit 42 shown in FIG. 6 has a pair of amplifiers 44 connected in series, and the output of each amplifier 44 is connected to the two sides of the resonant circuit 19 made up of the capacitor 18 and the transmitting coil 11. In the full-bridge output circuit 42 of the figure, the amplifiers 44 are inverting amplifiers that output signals phase inverted from the input signals. For AC power source 12 power transmission via this full-bridge output circuit 42, output from the AC power source 12 is input to one of the amplifiers 44 (input-side amplifier) and the output from that amplifier 44 is input to the other amplifier 44 (output-side amplifier) to output a signal and a phase inverted signal (complementary outputs) from the switching circuit 41. By supplying a signal and a phase inverted signal to the two terminals of the resonant circuit 19 made up of the capacitor 18 and transmitting coil 11, the capacitor 18 resonates in series with the transmitting coil 11 as a series resonant circuit 19B. Further, HIGH signals are input from the input circuit 43 to both amplifiers 44 of the full-bridge output circuit 42 to put both outputs at ground potential. As shown by the equivalent circuit of FIG. 7, this temporarily connects the capacitor 18 and transmitting coil 11 in parallel to form the parallel resonant circuit 19A.

Figure 8:
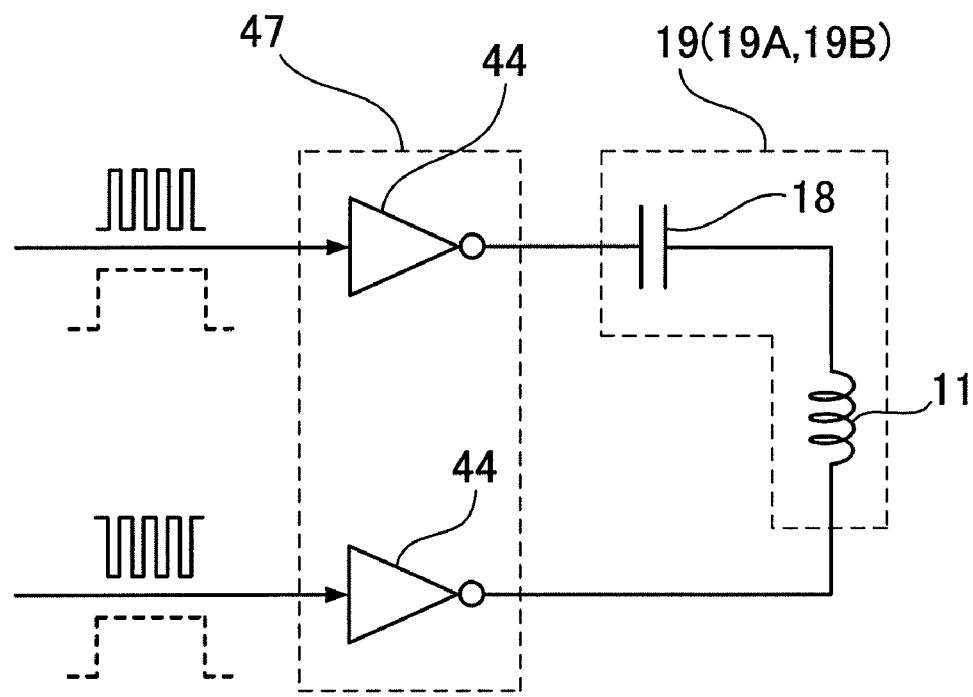
FIG. 8 is a circuit diagram showing another example of a full-bridge output circuit.

The full-bridge output circuit can also be implemented by the configuration shown in FIG. 8. The full-bridge output circuit 47 shown in this figure connects the output-sides of a pair of amplifiers 44 to the two terminals of the resonant circuit 19 made up of the capacitor 18 and transmitting coil 11. As shown by the solid line input signals of FIG. 8, an AC signal and a phase inverted AC signal are input to the two amplifiers 44 of the full-bridge output circuit 47 to output a phase inverted AC signal and a non-inverted AC signal, which are supplied to the transmitting coil 11. Specifically, when power is transmitted from the AC power source, a signal and phase inverted signal (complementary signals) are input to the two amplifiers 44. By supplying complementary signals to the two terminals of the resonant circuit 19, the capacitor 18 resonates in series with the transmitting coil 11 as a series resonant circuit 19B. Further, as shown by the broken line input signals of FIG. 8, HIGH signals are input to both amplifiers 44 of the full-bridge output circuit 47 to put both outputs at ground potential. As shown by the equivalent circuit of FIG. 7, this temporarily connects the capacitor 18 and transmitting coil 11 in parallel to form the parallel resonant circuit 19A. Since the pair of amplifiers 44 of the full-bridge output circuit 47 of the figure output signals that are phase inverted relative to the input (inverting amplifiers), HIGH signals are input to put the outputs at ground potential. However, both amplifiers of the full-bridge output circuit can also be amplifiers that output signals in phase with the inputs (non-inverting amplifiers), and LOW signals can be input to put the outputs at ground potential.

The AC power source 12 is connected to the transmitting coil 11 via flexible lead wires 16. This is because the transmitting coil 11 has to be moved close to the receiving coil 51 of a device housing a battery 50 that is placed on the top plate 21. Although not illustrated, the AC power source 12 can also be a self-excited oscillator circuit. AC output from this oscillator circuit is power amplified by the full-bridge output circuit and supplied to the transmitting coil. The self-excited oscillator circuit uses the transmitting coil 11 as an oscillator circuit inductor. Consequently, the oscillator frequency changes with the inductance of the transmitting coil 11. The inductance of the transmitting coil 11 changes with the relative position of the transmitting coil 11 with respect to the receiving coil 51. This is because the mutual inductance of the transmitting coil 11 and the receiving coil 51 changes with the relative position of the transmitting coil 11 with respect to the receiving coil 51. Therefore, the frequency of the self-excited oscillator circuit, which uses the transmitting coil 11 as an oscillator circuit inductor, changes as the transmitting coil 11 approaches the receiving coil 51. As a result, the self-excited oscillator circuit can detect the relative position of the transmitting coil 11 with respect to the receiving coil 51 from the change in oscillating frequency, and can be used with the dual purpose as a position detection controller 14.

The transmitting coil 11 is moved in close proximity to the receiving coil 51 by the moving mechanism 13. The moving mechanism 13 of FIGS. 1-4 moves the transmitting coil 11 along the inside of the top plate 21 in the X-axis direction and Y-axis direction to position it close to the receiving coil 51. The moving mechanism 13 of the figures rotates threaded rods 23 via servo motors 22 controlled by the position detection controller 14 to move nut blocks 24 that are threaded onto the threaded rods 23. The nut blocks 24 are moved to move the transmitting coil 11 close to the receiving coil 51. The servo motors 22 are provided with an X-axis servo motor 22A to move the transmitting coil 11 in the X-axis direction, and a Y-axis servo motor 22B to move the transmitting coil 11 in the Y-axis direction. The threaded rods 23 are provided with a pair of X-axis threaded rods 23A to move the transmitting coil 11 in the X-axis direction, and a Y-axis threaded rod 23B to move the transmitting coil 11 in the Y-axis direction. The pair of X-axis threaded rods 23A are disposed parallel to each other, and are connected via belts 25 to rotate together when driven by the X-axis servo motor 22A. The threaded nut blocks 24 are provided with a pair of X-axis nut blocks 24A that are threaded onto each X-axis threaded rod 23A, and a Y-axis nut block 24B that is threaded onto the Y-axis threaded rod 23B. Both ends of the Y-axis threaded rod 23B are connected to the X-axis nut blocks 24A in a manner allowing rotation. The transmitting coil 11 is mounted on the Y-axis nut block 24B.

Further, the moving mechanism 13 of the figures has a guide rod 26 disposed parallel to the Y-axis threaded rod 23B to move the transmitting coil 11 in the Y-axis direction while retaining it in a horizontal orientation. The guide rod 26 is connected at both ends to the X-axis nut blocks 24A and moves together with the pair of X-axis nut blocks 24A. The guide rod 26 passes through a guide block 27 attached to the transmitting coil 11 to allow transmitting coil 11 movement along the guide rod 26 in the Y-axis direction. Specifically, the transmitting coil 11 is moved with horizontal orientation in the Y-axis direction via the Y-axis nut block 24B and guide block 27 that move along the parallel disposed Y-axis threaded rod 23B and guide rod 26.

When the X-axis servo motor 22A rotates the X-axis threaded rods 23A of this moving mechanism 13, the pair of X-axis nut blocks 24A move along the X-axis threaded rods 23A to move the Y-axis threaded rod 23B and the guide rod 26 in the X-axis direction. When the Y-axis servo motor 22B rotates the Y-axis threaded rod 23B, the Y-axis nut block 24B moves along the Y-axis threaded rod 23B to move the transmitting coil 11 in the Y-axis direction. Here, the guide block 27 attached to the transmitting coil 11 moves along the guide rod 26 to maintain the transmitting coil 11 in a horizontal orientation during movement in the Y-axis direction. Consequently, rotation of the X-axis servo motor 22A and Y-axis servo motor 22B can be controlled by the position detection controller 14 to move the transmitting coil 11 in the X-axis and Y-axis directions. However, the battery charging pad of the present invention is not limited to a moving mechanism with the configuration described above. This is because any configuration of moving mechanism can be used that can move the transmitting coil in the X-axis and Y-axis directions.

Further, the battery charging pad of the present invention is not limited to a moving mechanism that moves the transmitting coil in the X-axis and Y-axis directions. This is because the battery charging pad of the present invention can be provided with a straight-line guide wall on the top plate, the devices housing a battery can be aligned along the guide wall, and the transmitting coil can be moved in a straight-line along the guide wall. Although not illustrated, this charging pad can move the transmitting coil in a straight-line along the guide wall with a moving mechanism that moves the transmitting coil in one direction such as in the X-axis direction only.

When the power switch 40 is switched ON, the position detection controller 14 detects the position of the transmitting coil 11 and the position of a device housing a battery 50 that is placed on the top plate 21. The position detection controller 14 of FIGS. 1-4 detects the position of the transmitting coil 11 and the position of the receiving coil 51 housed in the device housing a battery 50, and moves the transmitting coil 11 close to the receiving coil 51. Further, the position detection controller 14 is provided with a first position detection controller 14A that roughly determines the position of the receiving coil 51, and a second position detection controller 14B that determines the position of the receiving coil 51 with precision. In this position detection controller 14, the first position detection controller 14A detects the position of the transmitting coil 11, roughly determines the position of the receiving coil 51, and controls the moving mechanism 13 to move the transmitting coil 11 close to the receiving coil 51. Subsequently, the second position detection controller 14B detects the receiving coil 51 position with precision while controlling the moving mechanism 13 to move the transmitting coil 11 more accurately to the position of the receiving coil 51. This battery charging pad 10 can quickly move the transmitting coil 11 close to the receiving coil 51 with precision.

As shown in FIG. 5, the first position detection controller 14A is provided with a plurality of position detection coils 30 fixed to the inside of the top plate 21, a pulse generator 31 that supplies pulse signals to the position detection coils 30, a receiving circuit 32 that receives echo signals from the position detection coils 30 resulting from excitation of the transmitting coil 11 and the receiving coil 51 by pulse signals supplied to the position detection coils 30 from the pulse generator 31, and a discrimination circuit 33 that determines transmitting coil 11 and receiving coil 51 position from the echo signals received by the receiving circuit. 32.

Initially, when the power switch 40 is switched ON, the first position detection controller 14A detects the position of the transmitting coil 11, and the moving mechanism 13 moves the transmitting coil 11 to the origin reference point. Subsequently, the position detection controller 14 detects the position of the receiving coil 51 in a device housing a battery 50 placed on the top plate 21, and the moving mechanism 13 moves the transmitting coil 11 in close proximity to the receiving coil 51. During transmitting coil 11 position detection, both sides of the switching circuit 41 output are set to ground potential to detect transmitting coil 11 position from echo signals issued from the transmitting coil 11. At this time, even if a device housing a battery 50 is placed on the top plate 21 the position of the transmitting coil 11 can be accurately detected because of time delay differences in the echo signals, which is described later.

In the following embodiments, a battery charging pad configuration is described that detects the position of the transmitting coil 11, moves the transmitting coil 11 to the origin reference point, and subsequently moves the transmitting coil 11 in close proximity to the receiving coil 51. However, the battery charging pad of the present invention can also have a configuration that does not move the transmitting coil to the reference point after detecting transmitting coil position. After detecting transmitting coil position, receiving coil position can be detected, the distances in the X-axis direction and Y-axis direction from the transmitting coil to the receiving coil can be computed, and the transmitting coil can be moved by the computed distances to position it in close proximity to the receiving coil.

The position detection coils 30 are made up of a plurality of coils fixed at specified intervals on the inside surface of the top plate 21. The position detection coils 30 are provided with a plurality of X-axis detection coils 30A that detect transmitting coil 11 and receiving coil 51 position on the X-axis, and a plurality of Y-axis detection coils 30B that detect transmitting coil 11 and receiving coil 51 position on the Y-axis. Each X-axis detection coil 30A is a long narrow loop extending in the Y-axis direction, and the X-axis detection coils 30A are fixed to the inside of the top plate 21 at specified intervals. The interval (d) between adjacent X-axis detection coils 30A is smaller than the outside diameter (D) of the receiving coil 51 and the outside diameter of the transmitting coil 11 (W). Preferably, the interval (d) between X-axis detection coils 30A is from 1 times to ¼ times the outside diameter (D) of the receiving coil 51 and the outside diameter of the transmitting coil 11 (W). The position of the receiving coil 51 on the X-axis can be detected more accurately by reducing the interval (d) between X-axis detection coils 30A. Each Y-axis detection coil 30B is a long narrow loop extending in the X-axis direction, and the Y-axis detection coils 30B are also fixed to the inside of the top plate 21 at specified intervals. In the same manner as the X-axis detection coils 30A, the interval (d) between adjacent Y-axis detection coils 30B is smaller than the outside diameter (D) of the receiving coil 51 and the outside diameter of the transmitting coil 11 (W). Preferably, the interval (d) between Y-axis detection coils 30B is from 1 times to ¼ times the outside diameter (D) of the receiving coil 51 and the outside diameter of the transmitting coil 11 (W). The position of the receiving coil 51 on the Y-axis can also be detected more accurately by reducing the interval (d) between Y-axis detection coils 30B.

Figure 9:
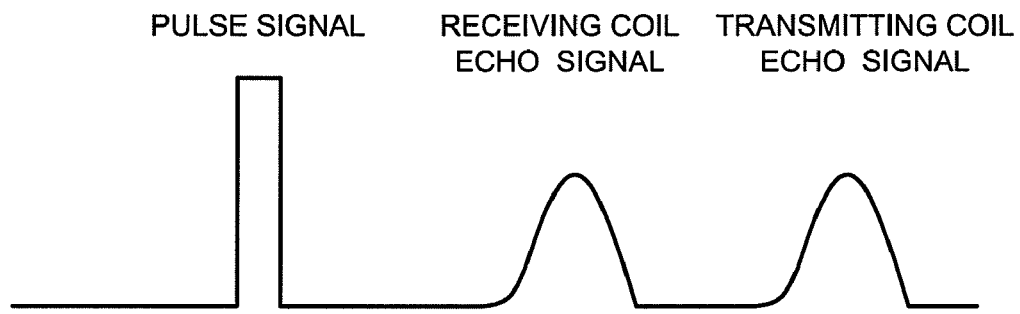
FIG. 9 is a waveform diagram showing an example of echo signal output from the receiving coil and the transmitting coil excited by a pulse signal.

The pulse generator 31 outputs pulse signals to the position detection coils 30 with a specified timing. A position detection coil 30, which has input a pulse signal, excites a nearby transmitting coil 11 or receiving coil 51 via the pulse signal. The transmitting coil 11 or receiving coil 51, which has been excited by a pulse signal, outputs an echo signal, which is generated by the energy of the induced current flow in the parallel resonant circuit 19A, 54, and that echo signal is detected by the position detection coil 30. Specifically, as shown in FIG. 9, following a given delay time after a pulse signal has been input to a position detection coil 30, the transmitting coil 11 or receiving coil 51 generates an echo signal, and that echo signal is induced in the position detection coil 30 near the transmitting coil 11 or receiving coil 51. Here, the capacitance C1 of the capacitor 18 connected in parallel with the transmitting coil 11 to form the parallel resonant circuit 19A is different than the capacitance C2 of the capacitor 53 connected in parallel with the receiving coil 51 to form the parallel resonant circuit 54 in the device housing a battery 50, and consequently the resonant frequencies are different. Therefore, after issuing a pulse signal, there is a time delay difference in the induced echo signals, and an echo signal from the transmitting coil can be easily distinguished from an echo signal from the receiving coil by the detection time delay. In the battery charging pad of the embodiments, the capacitance C1 of the capacitor 18 connected in parallel with the transmitting coil 11 to form the parallel resonant circuit 19A is made larger than the capacitance C2 of the capacitor 53 connected in parallel with the receiving coil 51 to form the parallel resonant circuit 54 in the device housing a battery 50. Said differently, the capacitance C2 of the capacitor 53 in the parallel resonant circuit 54 is smaller than the capacitance C1 of the capacitor 18 in the parallel resonant circuit 19A, and the effective capacitance C1 of capacitor 18 is greater than the capacitance C2 of capacitor 53. By increasing the capacitance C1 of the capacitor 18 in the parallel resonant circuit 19A, the power transmission efficiency of the transmitting coil 11 can be improved. As shown in FIG. 9, these capacitance values delay echo signal output from the transmitting coil 11 more than echo signal output from the receiving coil 51. Consequently, the difference in echo signal time delays allows an echo signal to be identified as being either from the transmitting coil 11 or from the receiving coil 51. As a result, this circuit structure allows echo signals from the transmitting coil 11 to be reliably distinguished from echo signals from the receiving coil 51 to accurately detect the positions of the transmitting coil 11 and receiving coil 51. In addition, detection of transmitting coil 11 position and receiving coil 51 position can be performed at the same time with a single position detection controller 14. Further, the transmitting coil 11 echo signal can be reliably distinguished to accurately detect transmitting coil 11 position even when a device housing a battery 50 is placed on the top plate 21 as described previously.

The echo signal induced in the position detection coil 30 is sent from the receiving circuit 32 to the discrimination circuit 33. The discrimination circuit 33 uses the echo signals input from the receiving circuit 32 to determine if the transmitting coil 11 or the receiving coil 51 is close to the position detection coil 30. When echo signals are induced in a plurality of position detection coils 30, the discrimination circuit 33 determines that the position detection coil 30 with the largest amplitude echo signal is closest to the transmitting coil 11 or the receiving coil 51.

The position detection controller 14 shown in FIG. 5 connects each position detection coil 30 to the receiving circuit 32 via a switching matrix 34. Since this position detection controller 14 can connect a plurality of position detection coils 30 by sequential switching, echo signals from a plurality of position detection coils 30 can be detected with one receiving circuit 32. However, a receiving circuit can also be connected to each position detection coil to detect the echo signals.

In the position detection controller 14 of FIG. 5, the discrimination circuit 33 controls the switching matrix 34 to sequentially switch each of the position detection coils 30 for connection to the receiving circuit 32. Since the pulse generator 31 is connected outside the switching matrix 34, it can output pulse signals to each position detection coil 30. The amplitude of the pulse signals output from the pulse generator 31 to the position detection coils 30 is extremely large compared to the echo signals from the transmitting coil 11 or the receiving coil 51. The receiving circuit 32 has a diode connected on its input-side that forms a voltage limiting circuit 35. Pulse signals input to the receiving circuit 32 from the pulse generator 31 are voltage limited by the limiting circuit 35. Low amplitude echo signals are input to the receiving circuit 32 without voltage limiting. The receiving circuit 32 amplifies and outputs both pulse signals and the echo signals. An echo signal output from the receiving circuit 32 is a signal that is delayed from the pulse signal by a given delay time such as several msec to several hundred μsec. Since the echo signal delay time from the pulse signal is a constant, a signal received after a constant delay time is assumed to be an echo signal, and the proximity of a position detection coil 30 to the transmitting coil 11 or receiving coil 51 is determined from the amplitude of that echo signal.

The receiving circuit 32 is an amplifier that amplifies echo signals input from the position detection coils 30. The receiving circuit 32 outputs each pulse signal and echo signal. The discrimination circuit 33 determines if the transmitting coil 11 or the receiving coil 51 is placed next to a position detection coil 30 from the pulse signal and echo signal input from the receiving circuit 32. The discrimination circuit 33 is provided with an analog-to-digital (A/D) converter 36 to convert the signals input from the receiving circuit 32 to digital signals. Digital signals output from the A/D converter 36 are processed to detect the echo signals. The discrimination circuit 33 detects a signal that is delayed from the pulse signal by a given delay time as an echo signal, and determines if the transmitting coil 11 or the receiving coil 51 is close to the position detection coil 30 from the amplitude of the echo signal.

The discrimination circuit 33 controls the switching matrix 34 to sequentially connect each of the plurality of X-axis detection coils 30A to the receiving circuit 32 to detect the position of the transmitting coil 11 or the receiving coil 51 along the X-axis. For each X-axis detection coil 30A connected to the receiving circuit 32, the discrimination circuit 33 outputs a pulse signal to that X-axis detection coil 30A and determines if the transmitting coil 11 or the receiving coil 51 is close to that X-axis detection coil 30A by detection or lack of detection of echo signals after given delay times from the pulse signal. The discrimination circuit 33 connects each one of the X-axis detection coils 30A to the receiving circuit 32, and determines if the transmitting coil 11 or the receiving coil 51 is close to any of the X-axis detection coils 30A. If the transmitting coil 11 or the receiving coil 51 is close to one of the X-axis detection coils 30A, an echo signal will be detected when that X-axis detection coil 30A is connected to the receiving circuit 32. Consequently, the discrimination circuit 33 can determine the position of the transmitting coil 11 or the receiving coil 51 along the X-axis from the X-axis detection coil 30 that outputs an echo signal. When the transmitting coil 11 or the receiving coil 51 straddles a plurality of X-axis detection coils 30, echo signals can be detected by a plurality of X-axis detection coils 30A. In that case, the discrimination circuit 33 determines that the transmitting coil 11 or the receiving coil 51 is closest to the X-axis detection coil 30A that detects the strongest echo signal, which is the echo signal with the largest amplitude. The discrimination circuit 33 controls the Y-axis detection coils 30B in the same manner to determine the position of the transmitting coil 11 or the receiving coil 51 along the Y-axis.

The discrimination circuit 33 controls the moving mechanism 13 according to the detected X-axis and Y-axis positions to move the transmitting coil 11 close to the receiving coil 51. After the power switch 40 has been switched ON and the position of the transmitting coil 11 has been detected, the discrimination circuit 33 controls the moving mechanism 13 to move the transmitting coil 11 to the origin reference point. At this time, the discrimination circuit 33 controls the X-axis servo motor 22A to move the transmitting coil 11 to the origin position on the X-axis. The discrimination circuit 33 also controls the Y-axis servo motor 22B to move the transmitting coil 11 to the origin position on the Y-axis. Here, both the X-axis servo motor 22A and the Y-axis servo motor 22B rotate to move the transmitting coil 11 from the detected position to the origin reference point. Subsequently, servo motor torque can be further applied for a given time in a direction to move the transmitting coil 11 toward the origin reference point and insure accurate positioning of the transmitting coil 11 at the origin reference point. In particular, this battery charging pad 10 has the characteristic that the transmitting coil 11 can be accurately moved to the origin reference point without precisely detecting the position of the transmitting coil 11 with the position detection controller 14. This is because a mechanism that prevents transmitting coil 11 movement beyond the origin reference point (in a direction towards the origin reference point) is mounted in the case.

The transmitting coil can also be moved to the reference point simply by rotating the servo motors for a long time period in the direction that moves the transmitting coil towards the reference point. However, since this method must be able to move the transmitting coil to the reference point from its furthest position, it is necessary to rotate the servo motors for a considerable time period. In a configuration where the servo motors apply torque even after the transmitting coil has been moved to the reference point, undesirable force is applied to the transmission mechanism. Or, the part of the transmission mechanism that absorbs servo motor rotation generates noise, and cannot be used as a preferred method.

After the transmitting coil 11 has been moved to the origin reference point, the position of the receiving coil 51 is detected with respect to the reference point, and the discrimination circuit 33 controls the moving mechanism 13 X-axis servo motor 22A to move the transmitting coil 11 at the reference point to the X-axis position of the receiving coil 51. The discrimination circuit 33 also controls the moving mechanism 13 Y-axis servo motor 22B to move the transmitting coil 11 to the Y-axis position of the receiving coil 51.

The battery charging pad 10 can detect the positions of the transmitting coil 11 and receiving coil 51 with the first position detection controller 14A, can move the transmitting coil 11 close to the receiving coil 51 with the moving mechanism 13, and can subsequently transmit power from the transmitting coil 11 to the receiving coil 51 to charge the battery 52. However, the battery charging pad can further refine the position of the transmitting coil 11 and move it still closer to the receiving coil 51 to subsequently transmit power and charge the battery 52. The transmitting coil 11 is more precisely positioned close to the receiving coil 51 by the second position detection controller 14B.

Figure 10:
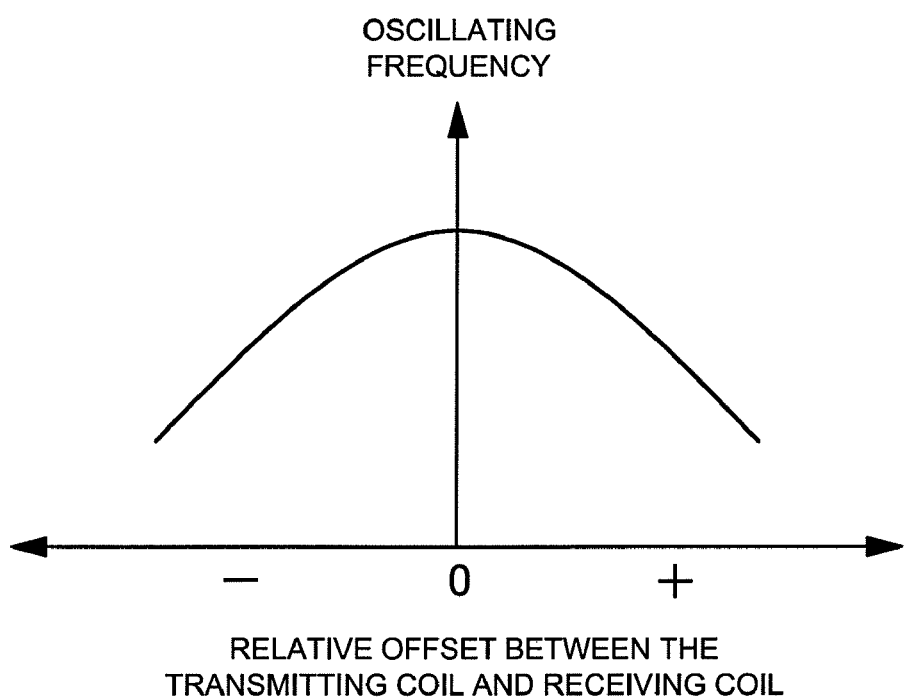
FIG. 10 is a graph showing oscillation frequency as a function of the relative positional offset between the transmitting coil and receiving coil.

The second position detection controller 14B has an AC power source 12 that is a self-excited oscillator circuit, the transmitting coil 11 position is accurately detected from the oscillating frequency of the self-excited oscillator circuit, and the second position detection controller 14B controls the moving mechanism 13. The second position detection controller 14B controls the moving mechanism 13 X-axis servo motor 22A and Y-axis servo motor 22B to move the transmitting coil 11 along the X and Y-axes while detecting the AC power source 12 oscillating frequency. Self-excited oscillator circuit oscillating frequency characteristics are shown in FIG. 10. This figure shows the change in oscillating frequency as a function of the relative offset (displacement) between the transmitting coil 11 and the receiving coil 51. As shown in this figure, the oscillating frequency of the self-excited oscillator circuit has a maximum where the transmitting coil 11 and receiving coil 51 are closest, and the oscillating frequency drops off as the two coils become separated. The second position detection controller 14B controls the moving mechanism 13 X-axis servo motor 22A to move the transmitting coil 11 along the X-axis, and stops the transmitting coil 11 where the oscillating frequency reaches a maximum. Similarly, the second position detection controller 14B controls the Y-axis servo motor 22B in the same manner to move the transmitting coil 11 along the Y-axis, and stops the transmitting coil 11 where the oscillating frequency reaches a maximum. The second position detection controller 14B can move the transmitting coil 11 in the manner described above to a position that is closest to the receiving coil 51.

In the battery charging pad described above, the first position detection controller 14A roughly detects the position of the receiving coil 51. Subsequently, the second position detection controller 14B finely adjusts the transmitting coil 11 position to move it still closer to the receiving coil 51. However, the position detection controller 64 shown in FIG. 11 and described below can move the transmitting coil 11 close to the receiving coil 51 without fine adjustments.

Figure 11:
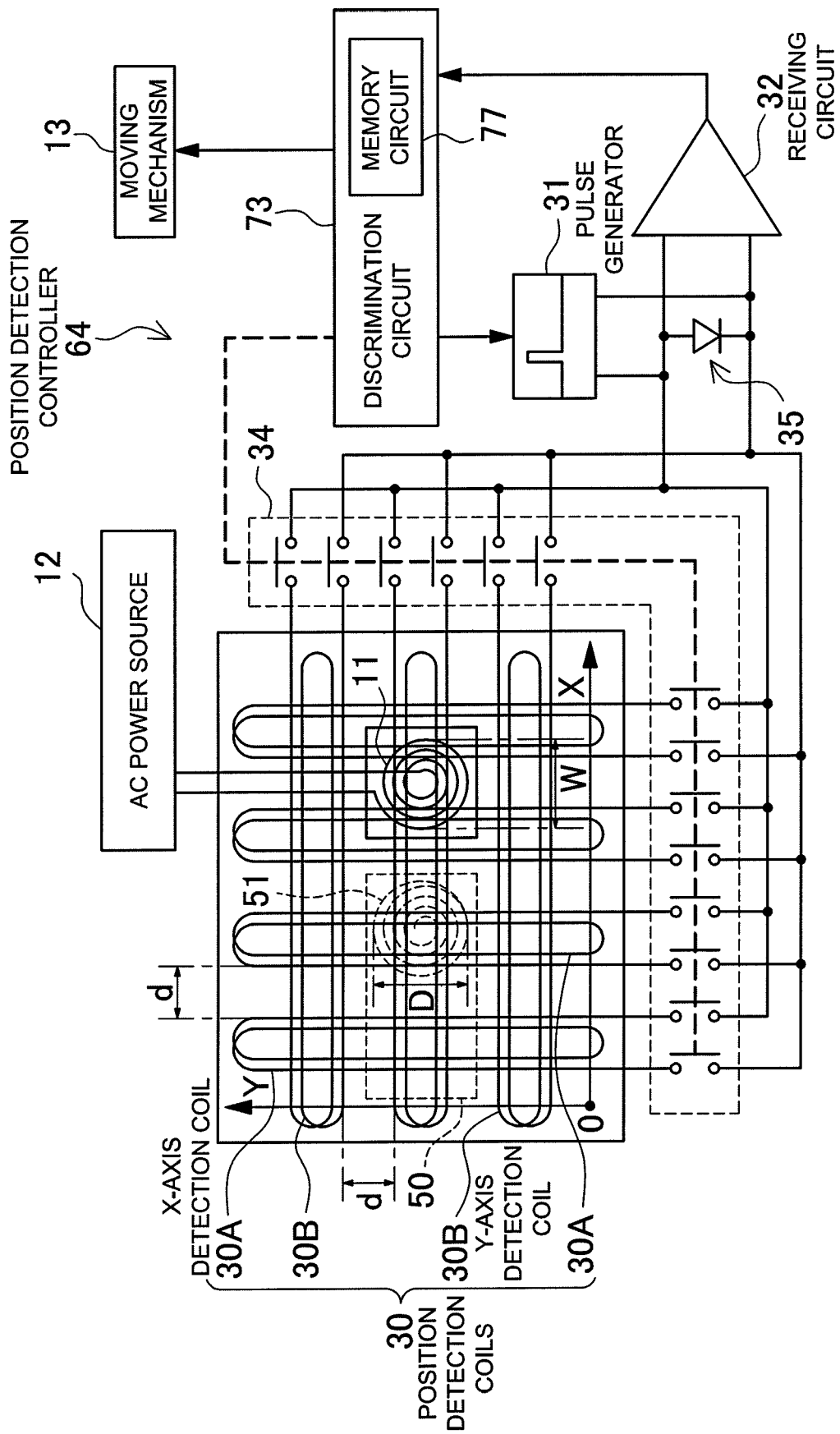
FIG. 11 is a circuit diagram showing the position detection controller of a battery charging pad for another embodiment of the present invention.

As shown in FIG. 11, the position detection controller 64 is provided with a plurality of position detection coils 30 fixed to the inside of the top plate, a pulse generator 31 that supplies pulse signals to the position detection coils 30, a receiving circuit 32 that receives echo signals from the position detection coils 30 resulting from excitation of the transmitting coil 11 or receiving coil 51 by pulse signals supplied to the position detection coils 30 from the pulse generator 31, and a discrimination circuit 73 that determines transmitting coil 11 or receiving coil 51 position from the echo signals received by the receiving circuit 32. In this position detection controller 64, the discrimination circuit 73 is provided with a memory circuit 77 to store the amplitude of echo signals induced in each position detection coil 30 corresponding to transmitting coil 11 or receiving coil 51 position. Specifically, this is the amplitude of echo signals resulting from transmitting coil 11 or receiving coil 51 pulse signal excitation that are induced in each position detection coil 30 after a given delay time, as shown in FIG. 9. The position detection controller 64 detects the amplitude of the echo signal induced in each position detection coil 30, and compares the detected echo signal amplitude with the echo signal amplitudes stored in the memory circuit 77 to determine the transmitting coil 11 or receiving coil 51 position.

Figure 12:
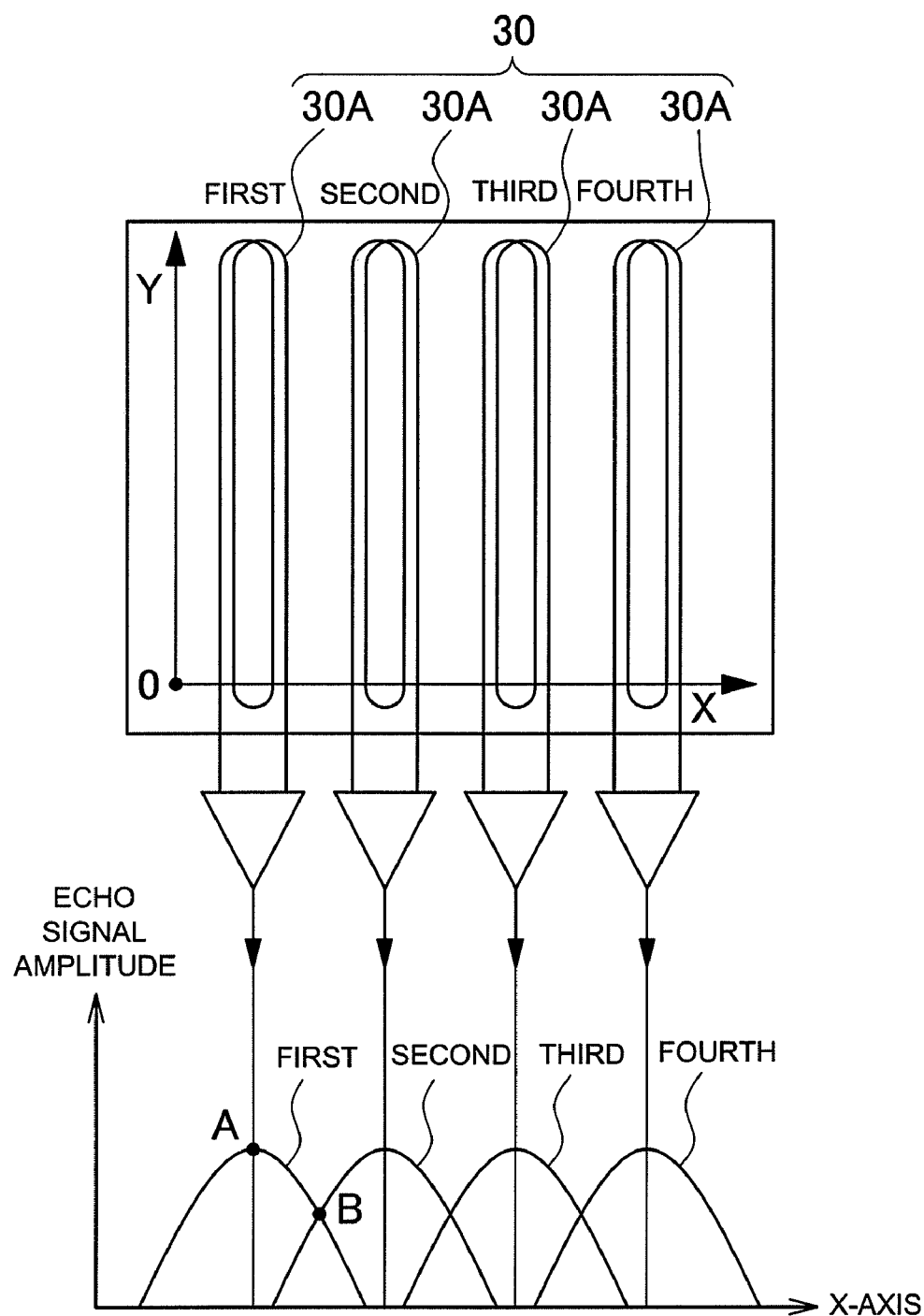
FIG. 12 is a schematic and graph showing the amplitude of echo signals induced in the position detection coils of the position detection controller shown in FIG. 11.

The position detection controller 64 determines transmitting coil 11 or receiving coil 51 position from the amplitude of the echo signal induced in each position detection coil 30 in the following manner. The position detection coils 30 shown in FIG. 11 are provided with a plurality of X-axis detection coils 30A that detect transmitting coil 11 or receiving coil 51 position on the X-axis, and a plurality of Y-axis detection coils 30B that detect transmitting coil 11 or receiving coil 51 position on the Y-axis. The position detection coils 30 are fixed to the inside of the top plate 21 at specified intervals. Each X-axis detection coil 30A is a long narrow loop extending in the Y-axis direction, and each Y-axis detection coil 30B is a long narrow loop extending in the X-axis direction. FIG. 12 shows the amplitude of the echo signal induced in each X-axis detection coil 30A as the transmitting coil 11 or receiving coil 51 is moved along the X-axis. The horizontal axis of FIG. 12 shows the position of the transmitting coil 11 or receiving coil 51 on the X-axis, and the vertical axis shows the amplitude of the echo signal induced in each X-axis detection coil 30A. This position detection controller 64 can determine the position of the transmitting coil 11 or receiving coil 51 on the X-axis by detecting the amplitude of the echo signal induced in each X-axis detection coil 30A. As shown in FIG. 12, the amplitude of the echo signal induced in each X-axis detection coil 30A changes as the transmitting coil 11 or receiving coil 51 position along the X-axis changes. For example, when the center of the transmitting coil 11 or receiving coil 51 is at the center of the first X-axis detection coil 30A, the amplitude of the echo signal induced in the first X-axis detection coil 30A is a maximum as shown by point A in FIG. 12. When the transmitting coil 11 or receiving coil 51 is halfway between the first and second X-axis detection coils 30A, the amplitude of the echo signals induced in the first and second X-axis detection coils 30A is equal as shown by point B in FIG. 12. Specifically, the amplitude of an echo signal detected in an X-axis detection coil 30A is maximum (strongest signal) when the transmitting coil 11 or receiving coil 51 is closest to that detection coil, and the amplitude of the echo signal decreases as the transmitting coil 11 or receiving coil 51 is separated from that detection coil. Therefore, the X-axis detection coil 30A closest to the transmitting coil 11 or receiving coil 51 can be determined by which X-axis detection coil 30A has the largest amplitude echo signal. When echo signals are induced in two X-axis detection coils 30A, the direction of transmitting coil 11 or receiving coil 51 offset from the X-axis detection coil 30A with the largest echo signal amplitude can be determined from the direction, relative to the X-axis detection coil 30A with the largest echo signal, of the other X-axis detection coil 30A that detects an echo signal. Further, the relative position of the transmitting coil 11 or receiving coil 51 between two X-axis detection coils 30A can be determined from the ratio of the amplitudes of the echo signals induced in the two X-axis detection coils 30A. For example, if the ratio between echo signal amplitudes detected in two X-axis detection coils 30A is one, the transmitting coil 11 or receiving coil 51 position can be determined to be halfway between the two X-axis detection coils 30A.

The discrimination circuit 73 stores in the memory circuit 77 the echo signal amplitude induced in each X-axis detection coil 30A corresponding to transmitting coil 11 or receiving coil 51 position on the X-axis. When the power switch 40 is switched ON and the position detection controller 64 supplies pulse signals to the X-axis detection coils 30A from the pulse generator 31, an echo signal is detected in one of the X-axis detection coils 30A. Therefore, the discrimination circuit 73 can determine the X-axis position of the transmitting coil 11 from the echo signal induced in the X-axis detection coil 30A. Similarly, when a receiving coil 51 is placed on the battery charging pad 10, an echo signal is detected in one of the X-axis detection coils 30A. Therefore, the discrimination circuit 73 can determine from the echo signal induced in the X-axis detection coil 30A that a receiving coil 51 has been placed on the battery charging pad 10; namely, that a device housing a battery 50 has been placed on the battery charging pad 10. Further, by comparing the amplitude of the echo signal induced in each X-axis detection coil 30A with the amplitudes stored in the memory circuit 77, the position of the transmitting coil 11 or receiving coil 51 on the X-axis can be determined. The discrimination circuit can also store a function in the memory circuit that specifies transmitting coil 11 or receiving coil X-axis position corresponding to the ratio of the amplitudes of echo signals induced in adjacent X-axis detection coils. Transmitting coil 11 or receiving coil position can be determined from the function stored in memory. This function can be determined by moving the transmitting coil or receiving coil between two X-axis detection coils and measuring the ratio of the echo signal amplitudes in the two detection coils. Here, the discrimination circuit 73 detects the ratio of the amplitudes of echo signals induced in two X-axis detection coils 30A. Based on the function stored in memory, the X-axis position of the transmitting coil 11 or receiving coil 51 between the two X-axis detection coils 30A can be computed from the detected echo signal amplitude ratio.

Discrimination circuit 73 detection of transmitting coil 11 or receiving coil 51 X-axis position from echo signals induced in the X-axis detection coils 39A is described above. Transmitting coil 11 or receiving coil 51 position on the Y-axis can be detected in a similar manner from echo signals induced in the Y-axis detection coils 30B.

When the discrimination circuit 73 has detected the transmitting coil 11 or receiving coil 51 position on the X and Y-axes, the position detection controller 64 moves the transmitting coil 11 to the receiving coil 51 position based on a position signal issued from the discrimination circuit 73. When an echo signal is detected having a waveform and delay time as described previously, the battery charging pad discrimination circuit 73 can recognize and distinguish that a receiving coil 51 of a device housing a battery 50 has been placed on the battery charging pad. When a waveform is detected and determined to be different from an echo signal, an object other than the receiving coil 51 of a device housing a battery 50 (for example, a metal foreign object) is assumed to be on the battery charging pad and the supply of power can be terminated. In addition, when no echo signal waveform is detected, it is assumed that no device housing a battery 50 receiving coil 51 has been placed on the battery charging pad and power is not supplied.

The battery charging pad 10 position detection controller 14, 64 controls the moving mechanism 13 to move the transmitting coil 11 close to the receiving coil 51. In this state, AC power is supplied to the transmitting coil 11 from the AC power source 12. AC power from the transmitting coil 11 is transmitted to the receiving coil 51 and used to charge the battery 52. When full-charge of the battery 52 is detected in the device housing a battery 50, charging is stopped and a full-charge signal is sent to the battery charging pad 10. The full-charge signal can be sent by various methods. The device housing a battery 50 can output a full-charge signal to the receiving coil 51, and the full-charge signal can be sent from the receiving coil 51 to the transmitting coil 11 to transmit full-charge information to the battery charging pad 10. The device housing a battery 50 can output an AC signal to the receiving coil 51 with a frequency different from that of the AC power source 12, and the battery charging pad 10 can receive that AC signal with the transmitting coil 11 to detect full-charge. The device housing a battery 50 can output a full-charge signal to the receiving coil 51 that is a modulated carrier wave with a specified frequency, and the battery charging pad 10 can receive the carrier wave of specified frequency and demodulate that signal to detect the full-charge signal. Further, the device housing a battery can wirelessly transmit a full-charge signal to the battery charging pad to send the full-charge information. Here, the device housing a battery contains a transmitter to send the full-charge signal, and the battery charging pad contains a receiver to receive the full-charge signal. The position detection controller 14 shown in FIG. 6 contains a full-charge detection circuit 17 to detect full-charge of the internal battery 52. This full-charge detection circuit 17 detects a full-charge signal sent from the device housing a battery 50 to detect battery 52 full-charge.

A battery charging pad 10, which has a top plate 21 where a plurality of devices housing a battery 50 can be placed, sequentially charges the battery 52 in each device housing a battery 50 to full-charge. This battery charging pad 10 first detects the position of the receiving coil 51 in any one of the devices housing a battery 50. The transmitting coil 11 is moved close to the receiving coil 51, and the battery 52 in that device housing a battery 50 is charged to full-charge. When the battery 52 in that device housing a battery 50 reaches full-charge and the full-charge detection circuit 17 receives a full-charge signal, the position detection controller 14 detects the position of another receiving coil 51 in a second device housing a battery 50 and controls the moving mechanism 13 to move the transmitting coil 11 to the receiving coil 51 of the second device housing a battery 50. In this state, power is transmitted to charge the battery 52 in the second device housing a battery 50 and that battery 52 is charged to full-charge. When the battery 52 in the second device housing a battery 50 reaches full-charge and the full-charge detection circuit 17 receives a full-charge signal from the second device housing a battery 50, the position detection controller 14 detects the position of the receiving coil 51 in a third device housing a battery 50 and controls the moving mechanism 13 to move the transmitting coil 11 to the receiving coil 51 of the third device housing a battery 50. In this state, power is transmitted to charge the battery 52 in the third device housing a battery 50 and that battery 52 is charged to full-charge. In this manner, when a plurality of devices housing a battery 50 are placed on the top plate 21, the battery charging pad 10 sequentially switches from one device housing a battery 50 to another to fully charge all the internal batteries 52. This battery charging pad 10 stores in memory the location of devices housing a battery 50 that have been fully charged, and does not charge the batteries 52 in devices that have been fully charged. When full-charge of the batteries 52 in all the devices housing a battery 50 placed on the top plate 21 has been detected, the battery charging pad 10 suspends operation of the AC power source 12 and stops battery 52 charging. In the embodiments described above, charging of the battery 52 in a device housing a battery 50 is stopped when full-charge is reached. However, it is also possible to treat a specific battery capacity as full-charge and stop charging when that specific battery capacity is reached.

The second position detection controller 14B shown in FIG. 6 determines the relative position of the transmitting coil 11 with respect to the receiving coil 51 from the change in oscillating frequency of a self-excited oscillator circuit. However, the second position detection controller, which finely adjusts the position of the transmitting coil relative to the receiving coil, can also detect the relative position of the transmitting coil with respect to the receiving coil from transmitting coil voltage, power consumption by the AC power source that supplies power to the transmitting coil, or current induced in the receiving coil. Since oscillating frequency variation is not required for this second position detection controller, the oscillator circuit can be a separately (externally) excited oscillator.

Figure 13:
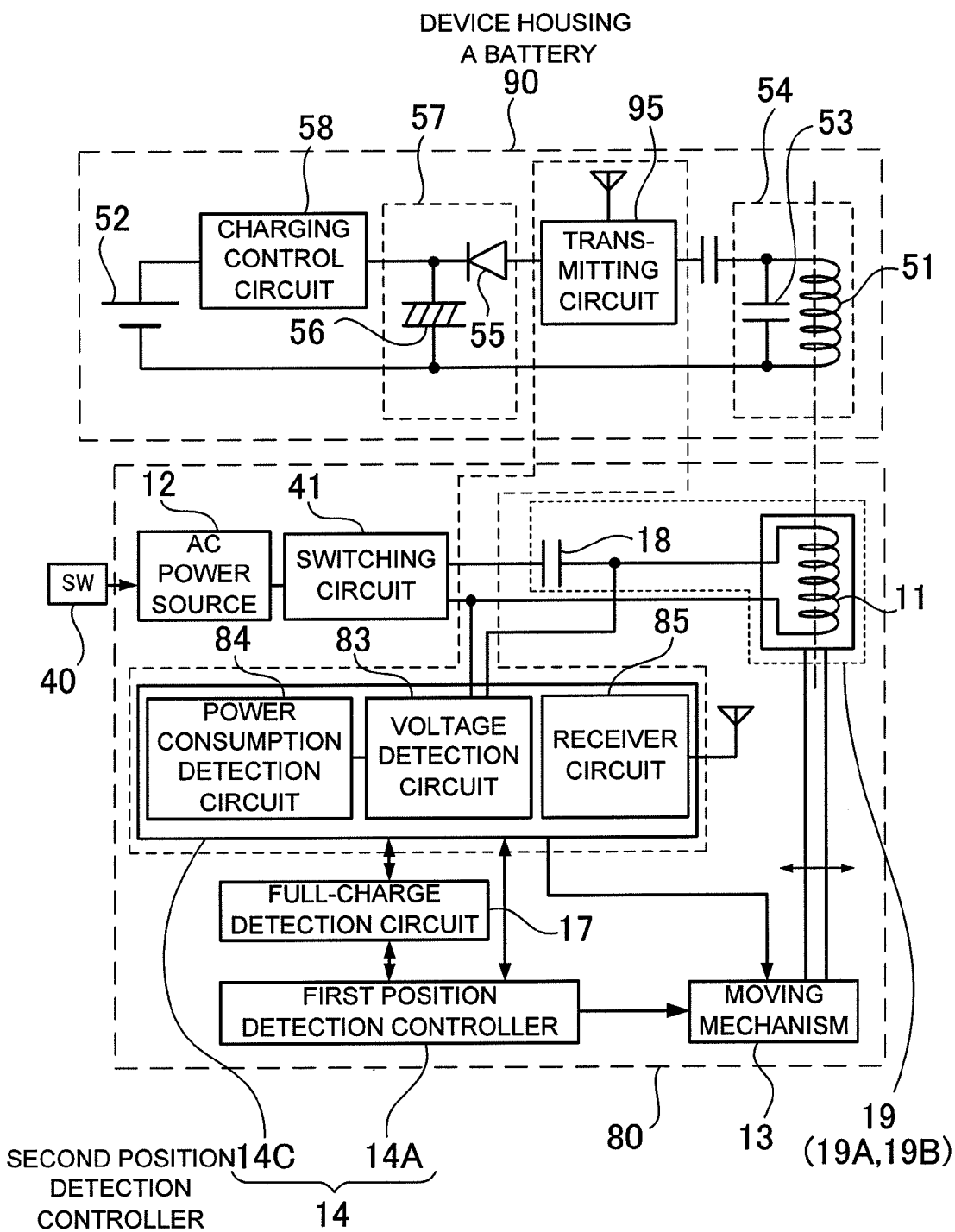
FIG. 13 is a block diagram of a battery charging pad and a device housing a battery for another embodiment of the present invention.
Figure 14:
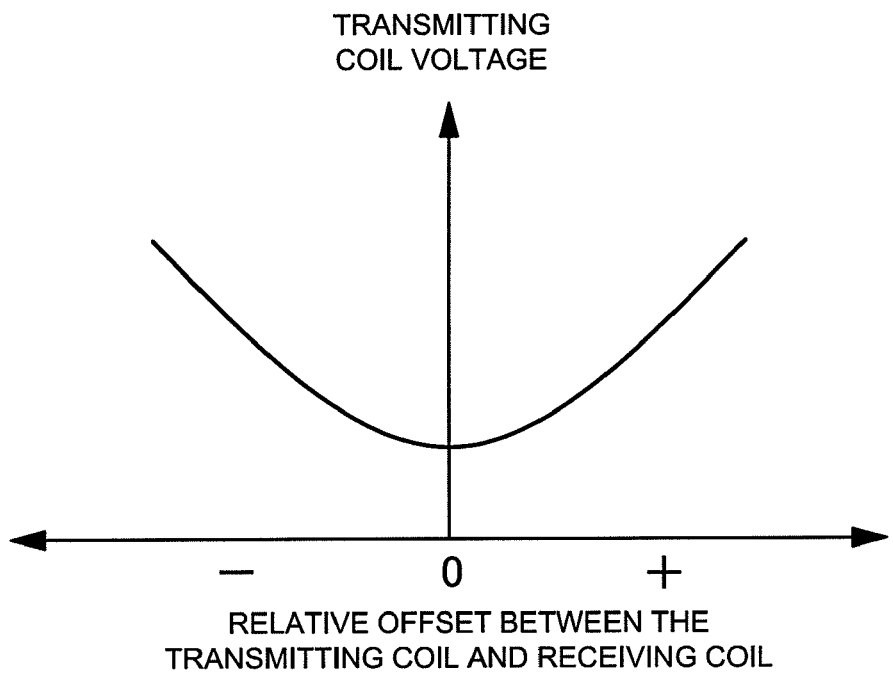
FIG. 14 is a graph showing transmitting coil voltage as a function of the relative positional offset between the transmitting coil and receiving coil.

In FIG. 13, the second position detection controller 14C, which detects the position of the transmitting coil 11 relative to the receiving coil 51 from transmitting coil 11 voltage, houses a voltage detection circuit 83 that detects transmitting coil 11 voltage. This second position detection controller 14C moves the transmitting coil 11 and detects transmitting coil 11 voltage with the voltage detection circuit 83. FIG. 14 shows transmitting coil 11 voltage characteristics as a function of transmitting coil 11 position relative to the receiving coil 51. This figure shows the change in voltage as a function of the relative offset (displacement) between the transmitting coil 11 and the receiving coil 51. As shown in this figure, transmitting coil 11 voltage has a minimum where the transmitting coil 11 and receiving coil 51 are closest, and the transmitting coil 11 voltage increases as the two coils become separated. The second position detection controller 14C controls the moving mechanism 13 X-axis servo motor 22A to move the transmitting coil 11 along the X-axis, and stops the transmitting coil 11 where the transmitting coil 11 voltage drops to a minimum. Similarly, the second position detection controller 14C controls the Y-axis servo motor 22B in the same manner to move the transmitting coil 11 along the Y-axis, and stops the transmitting coil 11 where the transmitting coil 11 voltage drops to a minimum. The second position detection controller 14C can move the transmitting coil 11 in the manner described above to a position that is closest to the receiving coil 51.

Figure 15:
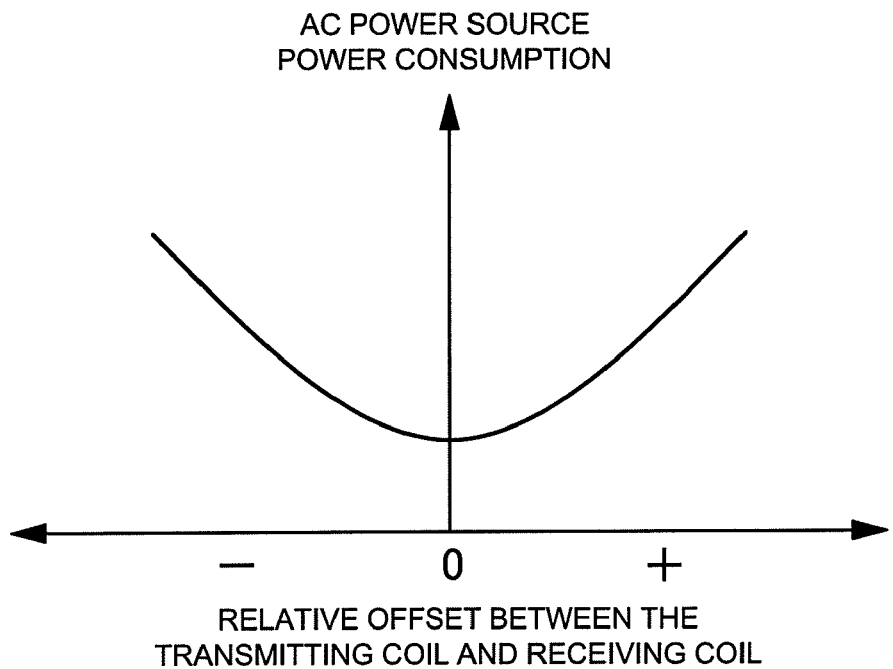
FIG. 15 is a graph showing the power consumption of the AC power source, which supplies power to the transmitting coil, as a function of the relative positional offset between the transmitting coil and receiving coil.

Further in FIG. 13, the second position detection controller 14C, which detects the position of the transmitting coil 11 relative to the receiving coil 51 from power consumption by the AC power source 12 that supplies power to the transmitting coil 11, houses a power consumption detection circuit 84 that detects AC power source 12 power consumption. This second position detection controller 14C moves the transmitting coil 11 and detects AC power source 12 power consumption with the power consumption detection circuit 84. FIG. 15 shows AC power source 12 power consumption characteristics as a function of transmitting coil 11 position relative to the receiving coil 51. This figure shows the change in AC power source 12 power consumption as a function of the relative offset (displacement) between the transmitting coil 11 and the receiving coil 51. As shown in this figure, AC power source 12 power consumption has a minimum where the transmitting coil 11 and receiving coil 51 are closest, and the consumed power increases as the two coils become separated. The second position detection controller 14C controls the moving mechanism 13 X-axis servo motor 22A to move the transmitting coil 11 along the X-axis, and stops the transmitting coil 11 where the AC power source 12 power consumption drops to a minimum. Similarly, the second position detection controller 14C controls the Y-axis servo motor 22B in the same manner to move the transmitting coil 11 along the Y-axis, and stops the transmitting coil 11 where the AC power source 12 power consumption drops to a minimum. The second position detection controller 14C can move the transmitting coil 11 in the manner described above to a position that is closest to the receiving coil 51.

Figure 16:
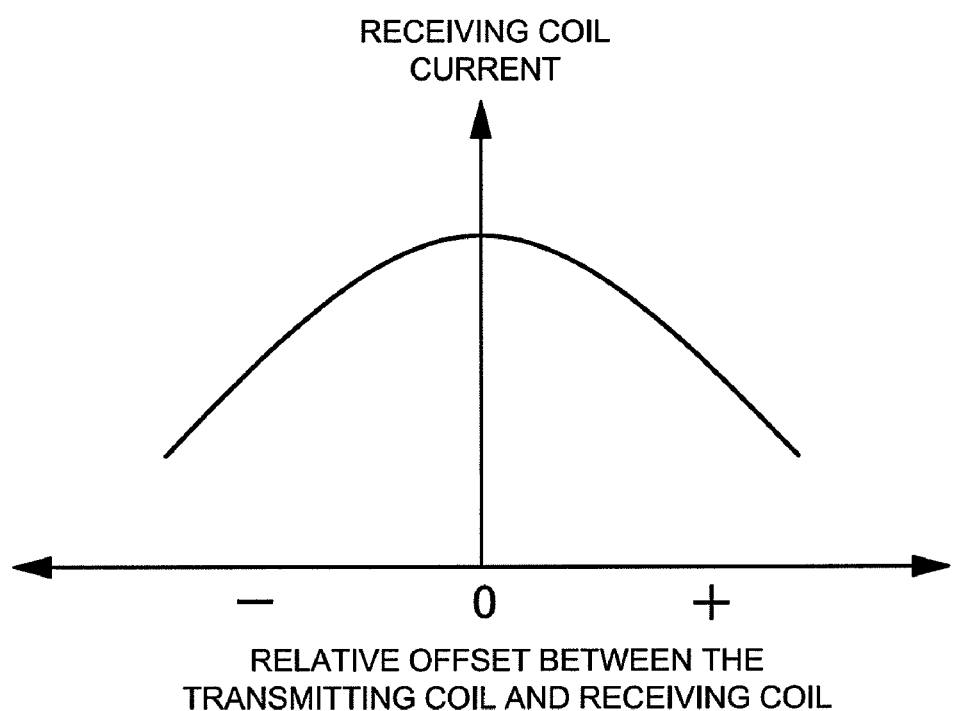
FIG. 16 is a graph showing receiving coil current as a function of the relative positional offset between the transmitting coil and receiving coil.

Further in FIG. 13, the second position detection controller 14C, which detects the position of the transmitting coil 11 relative to the receiving coil 51 from receiving coil 51 current, houses circuitry that detects receiving coil 51 current. This second position detection controller 14C is provided with a transmitting circuit 95 that modulates a carrier wave with receiving coil 51 current detected at the device housing a battery 90 and wirelessly transmits it to the battery charging pad 80, and a receiver circuit 85 at the battery charging pad 80 that receives signals sent from the transmitting circuit 95 and demodulates those signals to detect receiving coil 51 current. This second position detection controller 14C moves the transmitting coil 11 and detects receiving coil 51 current. FIG. 16 shows receiving coil 51 current characteristics as a function of transmitting coil 11 position relative to the receiving coil 51. This figure shows the change in receiving coil 51 current as a function of the relative offset (displacement) between the transmitting coil 11 and the receiving coil 51. As shown in this figure, receiving coil 51 current has a maximum where the transmitting coil 11 and receiving coil 51 are closest, and the current decreases as the two coils become separated. The second position detection controller 14C controls the moving mechanism 13 X-axis servo motor 22A to move the transmitting coil 11 along the X-axis, and stops the transmitting coil 11 where the receiving coil 51 current reaches a maximum. Similarly, the second position detection controller 14C controls the Y-axis servo motor 22B in the same manner to move the transmitting coil 11 along the Y-axis, and stops the transmitting coil 11 where the receiving coil 51 current reaches a maximum. The second position detection controller 14C can move the transmitting coil 11 in the manner described above to a position that is closest to the receiving coil 51.

The moving mechanism 13 described above moves the transmitting coil 11 in the X-axis direction and Y-axis direction to put the transmitting coil 11 in closest proximity to the receiving coil 51. However, the present invention is not limited to configurations that move the transmitting coil in the X-axis direction and Y-axis direction to position the transmitting coil close to the receiving coil, and the transmitting coil can be moved in various directions to put the transmitting coil in close proximity to the receiving coil.

It should be apparent to those with an ordinary skill in the art that while various preferred embodiments of the invention have been shown and described, it is contemplated that the invention is not limited to the particular embodiments disclosed, which are deemed to be merely illustrative of the inventive concepts and should not be interpreted as limiting the scope of the invention, and which are suitable for all modifications and changes falling within the spirit and scope of the invention as defined in the appended claims.

The present application is based on Application No. 2009-143677 filed in Japan on Jun. 16, 2009, the content of which is incorporated herein by reference.

What is claimed is:

1. A battery charging pad that transmits power from a transmitting coil to a magnetically coupled receiving coil to charge a battery housed in a device housing a battery, comprising:
    a transmitting coil disposed in close proximity to the receiving coil in the device housing the battery and configured to transmit electrical power to the receiving coil;
    a case configured to house the transmitting coil and including a top plate on which a device housing a battery is placed;
    a moving mechanism housed in the case that is configured to move the transmitting coil in close proximity to the receiving coil; and
    a position detection controller configured to detect a position of the device housing the battery placed on the top plate and to control the moving mechanism to move the transmitting coil in close proximity to the receiving coil in the device housing the battery;
    a capacitor configured to connect to the transmitting coil, the capacitor and the transmitting coil being configured to form a series resonant circuit or a parallel resonant circuit,
    wherein the position detection controller comprises:
        a plurality of position detection coils fixed to an inside surface of the top plate;
        a pulse generator configured to supply pulse signals to the position detection coils;
        a receiving circuit configured to receive echo signals output from the receiving coil and a transmitting coil to the position detection coils, as a result of excitation by pulse signals supplied from the pulse generator to the position detection coils; and
        a discrimination circuit configured to determine the position of the receiving coil and the transmitting coil from the echo signals received by the receiving circuit,
    wherein the position detection controller is configured to detect the position of the receiving coil and transmitting coil when the transmitting coil and the capacitor constitute the parallel resonant circuit, and to control the moving mechanism to move the transmitting coil in close proximity to the receiving coil.

2. The battery charging pad as cited in claim 1, wherein the position detection controller detects transmitting coil position and moves the transmitting coil to an X-axis direction and a Y-axis direction origin (0, 0point).

3. The battery charging pad as cited in claim 2, wherein the position detection controller detects the position of the transmitting coil, and from the detected transmitting coil position, computes the distances in the X-axis direction and Y-axis direction to move the transmitting coil to an origin reference point, and
    the position detection controller controls the moving mechanism to move the transmitting coil by the computed distances in the X-axis direction and Y-axis direction towards the origin reference point.

4. The battery charging pad as cited in claim 3, wherein the moving mechanism uses movement distances larger than computed distances to move the transmitting coil to the origin reference point, thereby absorbing moving mechanism slippage at the origin reference point.

5. The battery charging pad as cited in claim 3, wherein the moving mechanism includes servo motors configured move the transmitting coil, and
    the transmitting coil is moved to the origin reference point via the servo motors, and after the moving mechanism servo motors rotate to move the transmitting coil from the detected position to the origin reference point, torque is further applied for a given time in a direction to move the transmitting coil toward the origin reference point.

6. The battery charging pad as cited in claim 1, wherein the position detection controller detects a relative position of the transmitting coil with respect to the receiving coil and moves the transmitting coil into close proximity with the receiving coil.

7. The battery charging pad as cited in claim 1, wherein the position detection coils are made up of a plurality of rows of coils, and the position detection coils are fixed at given intervals to the inside surface of the top plate, and
    the position detection coils are provided with a plurality of X-axis detection coils that detect transmitting coil and receiving coil position in the X-axis direction, and a plurality of Y-axis detection coils that detect position in the Y-axis direction.

8. The battery charging pad as cited in claim 7, wherein the plurality of X-axis detection coils are shaped as long narrow loops extending in the Y-axis direction and fixed to the inside surface of the top plate at given intervals, and
    the plurality of Y-axis detection coils are shaped as long narrow loops extending in the X-axis direction and fixed to the inside surface of the top plate at given intervals.

9. The battery charging pad as cited in claim 8, wherein an interval (d) between adjacent X-axis detection coils is smaller than an outside diameter (D) of the receiving coil and smaller than an outside diameter (W) of the transmitting coil, and
    the interval (d) between adjacent Y-axis detection coils is smaller than the outside diameter (D) of the receiving coil and smaller than the outside diameter (W) of the transmitting coil.

10. The battery charging pad as cited in claim 1, wherein a switching circuit is provided between the transmitting coil and the AC power source, the switching circuit connecting the transmitting coil to the AC power source to supply AC power to the transmitting coil from the AC power source, and
    the switching circuit configures both sides of an output at ground potential to detect transmitting coil position.

11. The battery charging pad as cited in claim 10, wherein the capacitor is connected in parallel with the transmitting coil to form the parallel resonant circuit, and the switching circuit grounds both sides of the output to form the parallel resonant circuit with the capacitor and transmitting coil for detection of the transmitting coil position.

12. The battery charging pad as cited in claim 10, wherein the switching circuit includes an input circuit that grounds both sides of the output, and both sides of the switching circuit output are configured to be at ground potential by a control signal input from the input circuit.

13. The battery charging pad as cited in claim 12, wherein the switching circuit includes a full-bridge output circuit connected to the output-side of the AC power source, and the AC power source is configured to have the full-bridge output circuit connected to the output-side of an oscillator circuit to supply AC power to the transmitting coil.

14. The battery charging pad as cited in claim 1, wherein the AC power source includes an oscillator circuit, and an output of the oscillator circuit AC is amplified by a full-bridge output circuit and supplied to the transmitting coil.

15. The battery charging pad as cited in claim 10, wherein the switching circuit includes a full-bridge output circuit connected to the output-side of the AC power source, a voltage signal is input to the full-bridge output circuit to ground the output side, and both sides of the switching circuit output are configured to be at ground potential to detect transmitting coil position.

16. The battery charging pad as cited in claim 1, wherein the capacitor is connected in parallel with the transmitting coil to form the parallel resonant circuit,
   a capacitance C1 of the capacitor is a different value than a capacitance C2 of the capacitor connected in parallel with the receiving coil to form a parallel resonant circuit in the device housing the battery, and
   the position detection controller distinguishes the position of the transmitting coil and the receiving coil using different delay times of the echo signals output to the position detection coils from the transmitting coil and the receiving coil.

17. The battery charging pad as cited in claim 16, wherein the capacitor is connected in parallel with the transmitting coil to form the parallel resonant circuit,
   a capacitance C1 of the capacitor is larger than a capacitance C2 of the capacitor connected in parallel with the receiving coil to form the parallel resonant circuit in the device housing the battery, and
   the position detection controller distinguishes the position of the transmitting coil and the receiving coil using different delay times of the echo signals output to the position detection coils from the transmitting coil and the receiving coil.

18. The battery charging pad as cited in claim 1, wherein the position detection controller includes a first position detection controller that is configured to detect the position of the transmitting coil and the position of the receiving coil, and a second position detection controller that is configured to detect the position of the receiving coil with high precision, and
   the first position detection controller includes position detection coils.

19. The battery charging pad as cited in claim 18, wherein the second position detection controller detects receiving coil position by either an oscillating frequency of the AC power source, a transmitting coil voltage, AC power source power consumption, or a receiving coil current.

20. the battery charging paid as cited in claim 1, wherein the transmitting coil is configured to transmit the electric power to the receiving coil when the transmitting coil and the capacitor constitute the series resonant circuit.

* * * * *